(12) United States Patent
Antonini et al.

(10) Patent No.: US 11,743,589 B2
(45) Date of Patent: Aug. 29, 2023

(54) DEVICE FOR AUTONOMOUS TRACKING

(71) Applicant: AuTurn

(72) Inventors: Amado Antonini, Brookline, MA (US); Maria Santarelli, Brookline, MA (US); Moses Theodore Ort, Cambridge, MA (US); Emily Schweitzer, Hadley, MA (US)

(73) Assignee: AuTurn, Brookline, MA (US)

( * ) Notice: Subject to any disclaimer, the term of this patent is extended or adjusted under 35 U.S.C. 154(b) by 0 days.

(21) Appl. No.: 17/668,563

(22) Filed: Feb. 10, 2022

(65) Prior Publication Data

US 2022/0256090 A1    Aug. 11, 2022

Related U.S. Application Data

(60) Provisional application No. 63/200,029, filed on Feb. 10, 2021.

(51) Int. Cl.
*H04N 23/695* (2023.01)
*H04N 7/18* (2006.01)

(52) U.S. Cl.
CPC ............ *H04N 23/695* (2023.01); *H04N 7/18* (2013.01)

(58) Field of Classification Search
None
See application file for complete search history.

(56) References Cited

U.S. PATENT DOCUMENTS 10,554,896 B2    2/2020  Birkler
2012/0083314 A1    4/2012  Ng et al.
2015/0207961 A1    7/2015  Gavney, Jr.
2017/0155831 A1*    6/2017  Jang ..................... H04N 23/661
2018/0106418 A1    4/2018  Anglin
(Continued)

FOREIGN PATENT DOCUMENTS

CN    205226838 U    5/2016
WO    2018177564 A1    10/2018

OTHER PUBLICATIONS

Amazon/Foxnovo, Auto Selfie Tracking Phone Holder: Smart Motion Face Tracker Gimbowl 360 Rotation Moving Tripod Rotating Object Trackit for Vlog Streaming, Jan. 15, 2022.

(Continued)

*Primary Examiner* — Stefan Gadomski
(74) *Attorney, Agent, or Firm* — Caldwell Intellectual Property Law, LLC

(57) ABSTRACT

An autonomous tracking device, including a base, a body, the body rotatably mounted to the base, and a stand rotatably mounted to the body. The stand including a retention device configured to hold a mobile device, wherein the stand is configured to support the mobile device using the retention device. The device further including a panning motor configured to rotate the body with respect to the base. The device further comprising a camera configured to capture a scene within a field of view and create a digitized image. The device further comprising a controller containing circuitry configured to receive an object location communication as a function of the digitized image, generate a panning motor control signal, and send a panning motor control signal, wherein the panning motor control signal causes the panning motor to rotate the body such that the object remains in view of the camera.

17 Claims, 15 Drawing Sheets

(56) References Cited

U.S. PATENT DOCUMENTS

| | | | |
|---|---|---|---|
| 2018/0130214 A1 | 5/2018 | Demartin et al. | |
| 2019/0313540 A1* | 10/2019 | Solomon | H04N 23/61 |
| 2019/0327420 A1* | 10/2019 | Schieltz | G03B 17/561 |
| 2020/0266641 A1* | 8/2020 | Shikanai | H02J 7/00 |
| 2021/0014403 A1 | 1/2021 | Guyot et al. | |
| 2021/0150732 A1 | 5/2021 | Wang et al. | |
| 2022/0417431 A1* | 12/2022 | Yamada | H04N 23/63 |

OTHER PUBLICATIONS

Sikvio, Face Tracking Cell Phone Stand Desktop Phone Holder Dock with 360° Rotate Smart Object Track Camera Cradle for iPhone Android Phones Vlog Shooting Live Streaming Video Chat Face Time (Black), Jan. 15, 2022.

Obest, Auto Tracking Phone Holder,360°Rotation Face Object Tracking Stand,with Smart Motion Sensor AI Camera, No App,for Vlog,Live,Tiktok(Black), Jan. 15, 2022.

\* cited by examiner

DEVICE FOR AUTONOMOUS TRACKING

CROSS-REFERENCE TO RELATED APPLICATIONS

This application claims the benefit of priority of U.S. Provisional Patent Application Ser. No. 63/200,029, filed on Feb. 10, 2021, and titled "Tracking Holder for Handheld Devices," which is incorporated by reference herein in its entirety.

FIELD OF THE INVENTION

The present invention generally relates to the field of holders for handheld devices. In particular, the present invention is directed to a tracking holder for handheld devices.

BACKGROUND

As technology has progressed, the use of video conferences and recorded videos has increased. However, cameras are usually fixed in place. This means that subjects who are active or need to move around can find themselves out of frame of the video captured by the camera. Subjects may manually reposition the camera to keep themselves in view, but this eats up valuable time and can be disruptive to the video. Existing solutions in this field are not sufficient.

SUMMARY OF THE DISCLOSURE

In an aspect, an autonomous tracking device, the autonomous tracking device including a base, a body, the body rotatably mounted to the base, and a stand, wherein the stand includes a proximal end, the proximal end rotatably mounted to the body, a distal end, and a retention device configured to hold a mobile device, wherein the stand is configured to support the mobile device using the retention device. The device further including a panning motor, wherein the panning motor is configured to rotate the body with respect to the base about a vertical axis. The device further comprising a camera, wherein the camera is configured to capture a scene within a field of view of the camera and create a digitized image of the scene. The device further comprising a controller, wherein the controller contains circuitry configured to receive an object location communication as a function of the digitized image, generate a panning motor control signal as a function of the object location communication, and send a panning motor control signal to the panning motor, wherein the panning motor control signal causes the panning motor to rotate the body with respect to the base such that the object remains in the field of view of the camera.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for an autonomous tracking stand. In an embodiment, an apparatus for an autonomous tracking stand may include a camera, wherein the camera captures a scene within the field of view of the camera. The autonomous tracking stand may be able to orient the camera using panning motor. Thus, the autonomous tracking stand may be able to track a first object, by keeping the object in the field of view of the camera, using the panning motor. In some embodiments, the stand may include tilting motor. Similarly, the autonomous tracking stand may be able to track the object, by keeping the object in the field of view of the camera, using the tilting motor in conjunction with or separate from the panning motor.

Aspects of the present disclosure can be used to determine an object position as a function of a digitized image. In some embodiments, this may be accomplished using machine vision Aspects of the present disclosure allow for control of the motors using a controller. The controller may receive an object location communication and generate a controls signal for each of the panning motor and/or tilting motor as a function of the object location communication.

Figure 1:
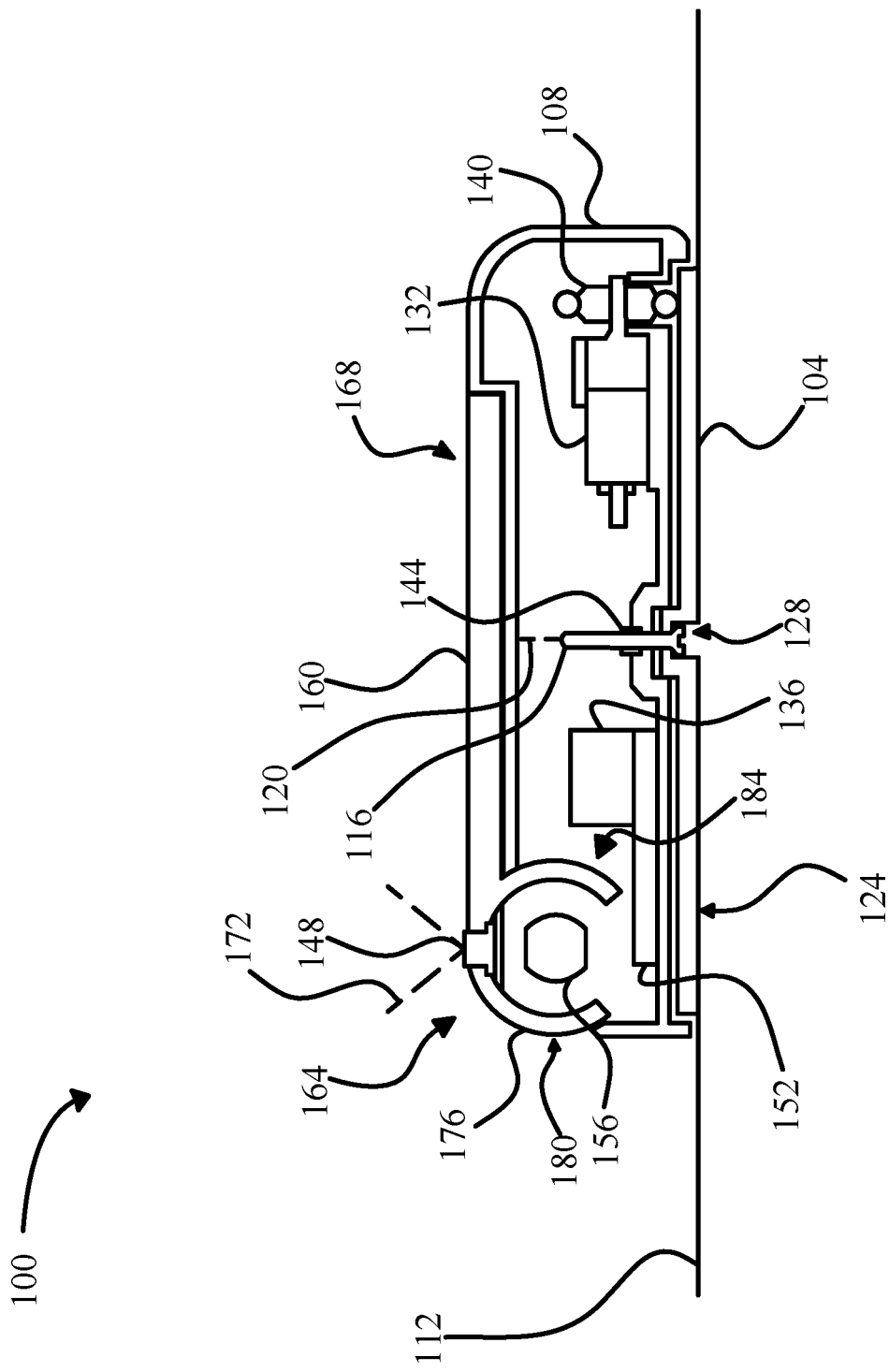
FIG. 1 is an illustration of an exemplary embodiment of an autonomous tracking device.

Referring now to FIG. 1, an exemplary embodiment of an autonomous tracking device 100 is depicted. The device 100 includes a base 104. For the purposes of this disclosure, a "base" is a structural component on which a structure or device rests. The base may provide stable support for a body 108. Base 104 may rest on a surface 112. For example, surface 112 may be any suitable surface, such as a kitchen counter, a desk, a table, a bookshelf, and the like. In some embodiments, surface 112 may be a substantially flat surface. In some embodiments, surface 112 may be a natural surface, such as the ground, a rock, a tree, and the like.

With continued reference to FIG. 1, base 104 may have a variety of profiles. For the purposes of this disclosure, a "profile" of base 104 is a horizontal cross-sectional shape of the base, or in other words a shape that base 104 makes when it is viewed from directly overhead. As a non-limiting example, base 104 may have a circular profile; shape may include any combination of polygonal and/or curved elements, and may be uniform or varying along a vertical axis or any other axis. As a further non-limiting example, base 104 may have a rectangular profile. As an additional non-limiting example, base 104 may have a square profile. As another non-limiting example, base 104 may have a hexagonal profile. A person of ordinary skill in the art, after having reviewed the entirety of this disclosure, would appreciate that base 104 may have a variety of shapes depending on the design constrains of device 100. Base 104 may vary in profile and size so long as it provides the interface for body 108 to rotate about.

With continued reference to FIG. 1, base 104 may be made from a variety of materials. In some embodiments, base 104 may include plastic. As a non-limiting example, base 104 may include polyethylene (PE). Particularly, as a non-limiting example, base 104 may include medium-density polyethylene (MDPE). As another non-limiting example, base 104 may include high-density polyethylene (HDPE). In some embodiments, base 104 may include metal. As a non-limiting example, base 104 may include aluminum. As a non-limiting example, base 104 may include steel. As a non-limiting example, base 104 may include titanium. In some embodiments, base 104 may include wood. Base 104 may be formed of ceramic material and/or composite materials such as fiberglass or the like. Base 104 may be formed of any combination of the above-described materials with each other and/or with other materials. A person of ordinary skill in the art, after having reviewed the entirety of this disclosure, would appreciate that base 104 may comprise a wide variety of materials depending on the structural and cost requirements for base 104. In some embodiments, base 104 may be solid. In some embodiments, base 104 may be hollow. Body 108 may be composed, without limitation, of any materials or combination of materials suitable for composition of base 104.

With continued reference to FIG. 1, base 104 may be connected to body 108 by a vertical axle 116. Body 108 is rotatably mounted to base 104. "Rotatably mounted," for the purposes of this disclosure means that at least two objects are mounted to one another such that one object can rotate with respect to another. In some embodiments, vertical axle 116 may provide a guide for body 108 to rotate about. In some embodiments, Vertical axle 116 may run through a hole in base 104. In some embodiments, vertical axle 116 may run through a hole in Body 108. In some embodiments, the hole in base 104 may be threaded. In some embodiments, the hole in body 108 may be threaded. In some embodiments, vertical axle 116 may have a threaded portion, such that vertical axle 116 may form a threaded connection with base 104 and/or body 108. In some embodiments, vertical axle 116 may be disposed along a vertical axis 120. Vertical axis may extend in a vertical direction.

With continued reference to FIG. 1, in some embodiments, base 104 may include a bottom face 124. Bottom face 124 of base 104 may be a surface and/or portion of base 104 configured to contact surface 112. In some embodiments, bottom face 124 of base 104 may be flat or substantially flat. In some embodiments, bottom face 124 of base 104 may be contoured. In some embodiments, the bottom face 124 of base 104 may have a coating. As a non-limiting example, the bottom face 124 of base 104 may include a rubber or other elastomeric coating, feet, ridges, or the like; this may serve to prevent base 104 from slipping when placed on a slippery or smooth surface.

With continued reference to FIG. 1, in some embodiments, bottom face 124 may define a vertical axle recess 128. Vertical axle recess 128 may, in some embodiments, accommodate at least a portion of vertical axle 116. In some embodiments, vertical axle recess 128 may allow for no portion of vertical axle to protrude from bottom face 124. This may mean that, in some embodiments, no portion of vertical axle 116 may protrude beyond a plane of the portions of bottom face 124 surrounding vertical axle recess 128; vertical axle 116 may, for instance, not contact surface 112. In some embodiments, wherein vertical axle 116 comprises a head portion, the head portion of vertical axle 116 may be accommodated within vertical axle recess 128.

With continued reference to FIG. 1, device 100 comprises a body 108. Body 108 have a variety of shapes. The exact shape of body 108 may vary in, as non-limiting example, diameter, height, and edge profile. In some embodiments, body 108 may be sized such that it can be easily handled by the user with a single hand. As a non-limiting example, body 108 may be sized such that a user can pick it up and hold it with only one hand. In some embodiments, the diameter of body 108 may be 6 inches. In some embodiments, the diameter of body 108 may be 7 inches. In some embodiments, the diameter of body 108 may be 10 inches. In some embodiments, the diameter of body 108 may be comparable to a length of a medium-sized smartphone. Body 108 may have an inner surface defining a hollow that, when body is combined with base, forms an interior of device 100. Inner surface may have a cross-sectional shape matching a cross-sectional shape of base 104; for instance, base 104 may be substantially cylindrical, and inner surface of body may be substantially cylindrical as well.

With continued reference to FIG. 1, body 108 may have a variety of profiles. For the purposes of this disclosure, the "profile" of body 108 is an exterior horizontal cross-sectional shape or a shape that body 108 makes when it is viewed from directly overhead. Profile may include without limitation any shape suitable for shape of base. As a non-limiting example, body 108 may have a circular profile. As a non-limiting example, body 108 may have a rectangular profile. As further a non-limiting example, body 108 may have a square profile. As an additional non-limiting example, body 108 may have a hexagonal profile. A person of ordinary skill in the art, after having reviewed the entirety of this disclosure, would appreciate that body 108 may have a variety of shapes depending on the design constrains of device 100. Body 108 may vary in profile and size so long as it provides the interface for body 108 to rotate about. Shape may vary over a vertical axis; for instance body may taper or fillet in a transitional section prior to a top surface.

With continued reference to FIG. 1, device 100 includes a panning motor 132. In some embodiments, the panning motor 132 may be disposed within body 108. Panning motor 132, in some embodiments, may receive power from an energy source 136. In some embodiments, panning motor 132 may require a control signal. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy source 136 other than control signal. In some cases, upon receiving a control signal, panning motor 132 responds by converting source power into mechanical motion. In some cases, panning motor 132 may be understood as a form of automation or automatic control.

With continued reference to FIG. 1, in some embodiments, panning motor 132 may include a variety of motors. For the purposes of this disclosure, a "motor" is a machine that converts another form of energy into motive energy. AS a non-limiting example, panning motor 132 may be an electric motor, meaning that it may convert electrical energy into motive energy. As a non-limiting example, panning motor 132 may be an alternating current (AC) brushless motor. As a non-limiting example, panning motor 132 may be a direct current (DC) brushless motor. As a non-limiting example, panning motor 132 may be a direct current (DC) brushed motor. As a non-limiting example, panning motor 132 may be a direct drive motor. As a non-limiting example, panning motor 132 may be a servo motor. A servo motor incorporated a feedback sensor in order to provide accurate positioning. As a non-limiting example, the feedback sensor may be consistent with any position sensor disclosed as part of this disclosure. As a non-limiting example, panning motor 132 may be a stepper motor.

With continued reference to FIG. 1, in some embodiments, panning motor 132 may include an actuator. An actuator may include a component of a machine that is responsible for moving and/or controlling a mechanism or system. In some embodiments, panning motor 132 may include a hydraulic actuator. A hydraulic actuator may consist of a cylinder or fluid motor that uses hydraulic power to facilitate mechanical operation. Output of hydraulic panning motor 132 may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 1, in some embodiments, panning motor 132 may include a pneumatic panning motor 132. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 1, in some cases, panning motor 132 may include and/or be connected to an electric actuator. Electric panning motor 132 may include any of electromechanical actuators, linear motors, and the like. In some cases, panning motor 132 may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric panning motor 132 may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIG. 1, in some embodiments, panning motor 132 may include a mechanical panning motor 132. In some cases, a mechanical panning motor 132 may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

With continued reference to FIG. 1, panning motor 132 is configured to rotate body 108 with respect to base 104 about a vertical axis 120. In some embodiments, panning motor 132 is configured to rotate body 108 with respect to base 104 about a vertical axle 116. In some embodiments, panning motor 132 may be mechanically connected to a wheel 140. In some embodiments, the panning motor 132 drives wheel 140. For the purposes of this disclosure, a "wheel" is a circular device that revolves around an axle. In some embodiments, wheel 140 may be connected to panning motor 132 by an axle. As a non-limiting example, the axle may connect to wheel 140 at a wheel hub.

With continued reference to FIG. 1, in some embodiments, wheel 140 may include an exterior surface. In some embodiments, the exterior surface may be the wheel rim, wherein the wheel rim is a circular structural component connected to a wheel hub. In some embodiment, the exterior surface may be a coating disposed on the wheel rim. In some embodiments, the exterior surface may be a component of a tire. A "tire" for the purposes of this disclosure is a ring-shaped component that surrounds a wheel rim. The tire may be the portion of wheel 140 that contacts the surface over which wheel 140 travels. At least a portion of the exterior surface of wheel 140 may be in contact with base 104. In some embodiments, when body 108 rotates with respect to base 104, wheel may come into contact with a wheel path on base 104. In some embodiments, wheel path may include a track. Track may, as a non-limiting example, contain members designed to keep wheel 140 on wheel path. In some embodiments, wheel 140 may interface with the track in order to keep wheel 140 on the track. In some embodiments, wheel 140 may be a circular gear. In this case, the wheel path over which wheel 140 travels may include a linear gear, wherein the teeth on the linear gear may be configured to mate with the teeth on wheel 140. In this configuration, the combination of wheel 140 and the wheel path with a linear gear may be called a rack and pinon.

With continued reference to FIG. 1, in some embodiments, the exterior surface of wheel 140 may comprise an elastomeric material. For the purposes of this disclosure, an "elastomeric material" is a polymer that exhibits both elastic and viscous properties when undergoing deformation. As a non-limiting example, the elastomeric material may include styrene butadiene rubber. As a non-limiting example, the elastomeric material may include polyisoprene rubber. As a non-limiting example, the elastomeric material may include butyl rubber. As a non-limiting example, the elastomeric material may include ethylene propylene rubber. In some embodiments, the exterior surface of wheel 140 may include a plurality of elastomeric materials. In some embodiments, the exterior surface of wheel 140 may include a mixture of multiple of elastomeric materials. When the exterior surface of wheel 140 includes an elastomeric material, wheel 140 may be able to better grip base 104 due to, as a non-limiting example, a higher friction coefficient between the exterior surface of wheel 140 and base 104. This may allow for wheel 140 to better drive the rotation of body 108 with respect to base 104.

With continued reference to FIG. 1, in some embodiments, vertical axle may be connected to a rotation device 144. In some embodiments rotation device may provide a body about which body 108 may rotate. In some embodiments, rotation device 144 may include a bearing. For the purposes of this disclosure, a "bearing" is a mechanical device that constrains relative motion and reduces friction between moving parts. In some embodiments, bearing may restrain the relative motion of the body with respect to the base such that it is only about vertical axis 120. Bearing may include a variety of bearings. As a non-limiting example, bearing may include a plain bearing. A plain bearing comprises a bearing surface against which a shaft may rotate. A plain bearing does not include any rolling element. Some bearings may include rolling elements in order to reduce rotational friction. As a non-limiting example, bearing may include a ball bearing. As a non-limiting example, bearing may include a single row ball bearing. A single row ball bearing contains a single row of ball bearings. A bearing may have an inner surface and an outer surface. The inner surface and the outer surface may be called "races." In a single row ball bearing, the rolling elements are arranged in one row and sandwiched between the races of the bearing. As a non-limiting example, bearing may include a double row ball bearing. A double row ball bearing is similar to a single row ball bearing, except that there is a double row of rolling elements between the races of the bearing. In some embodiments, bearing may be a roller bearing. As a non-limiting example, bearing may include a cylindrical roller bearing. A cylindrical roller bearing may include cylindrical rolling elements between the races of the bearing. A person of ordinary skill in the art, after having reviewed the entirety of this disclosure, would appreciate that a variety of different bearings may be used as bearing, depending on the robustness needed for bearing as well as the loads that bearing may be subject to. In some embodiments, rotation device 144 may include a shoulder bolt. A shoulder bolt is a bolt with a smooth shoulder and a threaded end that can be used to create a pivot point.

With continued reference to FIG. 1, in some embodiments, body 108 may include an energy source 136. For the purposes of this disclosure, an "energy source," is a source or store of electrical or chemical energy. Energy source 136 may include an electrochemical cell or a plurality of electrochemical cells. In some embodiments, energy source 136 may include a battery. For the purposes of this disclosure, a "battery" is a source of electrical energy including one or more electrochemical cells. In some embodiments, energy source 136 may include cylindrical battery cells. In some embodiments, energy source 136, may include lithium-ion batteries and/or lithium-metal batteries. In other embodiments, energy source 136 may include a variety of other types of batteries, such as, as non-limiting examples, Zinc-carbon, Alkaline, primary lithium batteries, Nickel Cadmium batteries, Nickel-metal hydride batteries, Nickel-zinc batteries, and the like. Energy source 136 may be electrically connected to a camera 148. Energy source 136 is electrically connected to at least a controller 152 and the panning motor 132. In some embodiments, energy source 136 may be electrically connected to a tilting motor 156. As a non-limiting example, in these embodiments, energy source may supply power to computing device 124 and/or recharge the energy source on board computing device 124. In some embodiments, energy source 136 may include rechargeable batteries, such that energy source 136 is rechargeable. In some embodiments, energy source 136 may include a connection to an external energy source. As a non-limiting example energy source 136 may include a connection to a wall outlet.

With continued reference to FIG. 1, device 100 contains a stand 160. Stand 160 may be consistent with any rocker. A "stand," for the purposes of this disclosure, means a physical component configured to hold or support another object in a viewable position. Stand 160 includes a proximal end 164. For the purposes of this disclosure, the "proximal end" of stand 160 is the portion of the stand closest to the connection between stand 160 and body 108. Proximal end 164 is rotatably mounted to body 108. For the purposes of this disclosure, "rotatably mounted" means mounted such that the objects may rotate with respect to one another. The stand 160 includes a distal end 168. For the purposes of this disclosure, the "distal end" of stand 160 is the portion of the stand that is furthest from the connection between stand 160 and body 108.

With continued reference to FIG. 1, in some embodiments, stand 160 may have a stowed position. As depicted in FIG. 1, stand 160 is in an exemplary embodiment of a stowed position. The stowed position may be implemented, without limitation, as described in further detail below.

With continued reference to FIG. 1, device 100 includes a camera 148. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. In some embodiments, camera 148 may be an infrared camera, wherein camera 148 detects infrared electromagnetic radiation. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image.

With continued reference to FIG. 1, camera 148 is configured to capture a scene within a field of view 172 of camera 148. For the purposes of this disclosure, a "field of view" of camera 148 is the area in which camera 148 can sense electromagnetic radiation. Camera 148 is also configured to create a digitized image of the scene. The "digitized image" may be consistent with a digital image described above. In some embodiments, camera 148 may be attached to stand 160 such that camera 148 rotates with stand 160. In some embodiments, when stand 160 is in the stowed position, field of view 172 points in the vertical direction. Field of view 172 may point in a vertical direction when the center vector of field of view 172 is substantially vertical. For the purposes of this disclosure, "substantially vertical" means within 10 degrees of vertical. This may be observed with reference to FIG. 1.

With continued reference to FIG. 1, device 100 may include a tilting motor 156. In some embodiments, the tilting motor 156 may be disposed within body 108. Tilting motor 156, in some embodiments, may receive power from an energy source 136. In some embodiments, tilting motor 156 may require a control signal. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy source 136 other than control signal. In some cases, upon receiving a control signal, tilting motor 156 responds by converting source power into mechanical motion. In some cases, tilting motor 156 may be understood as a form of automation or automatic control.

With continued reference to FIG. 1, in some embodiments, tilting motor 156 may include a variety of motors, including without limitation any kind of motor suitable for use as panning motor. For the purposes of this disclosure, a "motor" is a machine that converts another form of energy into motive energy. As a non-limiting example, tilting motor 156 may be an electric motor, meaning that it may convert electrical energy into motive energy. As a non-limiting example, tilting motor 156 may be an alternating current (AC) brushless motor. As a non-limiting example, tilting motor 156 may be a direct current (DC) brushless motor. As a non-limiting example, tilting motor 156 may be a direct current (DC) brushed motor. As a non-limiting example, tilting motor 156 may be a direct drive motor. As a non-limiting example, tilting motor 156 may be a servo motor. A servo motor incorporated a feedback sensor in order to provide accurate positioning. As a non-limiting example, the feedback sensor may be consistent with any position sensor disclosed as part of this disclosure. As a non-limiting example, tilting motor 156 may be a stepper motor.

With continued reference to FIG. 1, in some embodiments, tilting motor 156 may include an actuator. An actuator may include a component of a machine that is responsible for moving and/or controlling a mechanism or system. In some embodiments, tilting motor 156 may include a hydraulic actuator. A hydraulic actuator may consist of a cylinder or fluid motor that uses hydraulic power to facilitate mechanical operation. Output of hydraulic tilting motor 156 may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 1, in some embodiments, tilting motor 156 may include a pneumatic tilting motor 156. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 1, in some cases, tilting motor 156 may include an electric actuator. Electric tilting motor 156 may include any of electromechanical actuators, linear motors, and the like. In some cases, tilting motor 156 may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric tilting motor 156 may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIG. 1, in some embodiments, a tilting motor 156 may include a mechanical tilting motor 156. In some cases, a mechanical tilting motor 156 may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

With continued reference to FIG. 1, tilting motor 156, in some embodiments, may be configured to rotate stand 160 relative to body 108 about a horizontal axis. In some embodiments, tilting motor 156 may be connected to stand by a tilting motor axle.

With continued reference to FIG. 1, stand 160 may include a tilting motor housing 176. For the purposes of this disclosure, the "tilting motor housing" is the portion of stand that at least partially surrounds tilting motor 156. In some embodiments, tilting motor housing 176 may comprise a first motor housing arm 180 and/or a second motor housing arm 184. In some embodiments, the tilting motor housing may be made from the same material as other components of stand 160. In some embodiments, first motor housing arm 180 and second motor housing arm 184 may be semicircular elements. In some embodiments, first motor housing arm 180 and second motor housing arm 184 may be rectangular elements. A person of ordinary skill in the art, after having reviewed the entirety of this disclosure, would appreciate that the first motor housing arm 180 and second motor housing arm 184 may be any shape sufficient to accommodate tilting motor 156. In some embodiments, one of the first motor housing arm 180 and second motor housing arm 184 may be longer than the other. This may be desirable for many reasons. For example, one of the first motor housing arm 180 and second motor housing arm 184 may be longer than the other so that tilting motor housing may obstruct a user's view into the interior of base 104 no matter what position stand 160 is in. Alternatively, as another non-limiting example, one of the first motor housing arm 180 and second motor housing arm 184 may be longer than the other in order to accommodate tilting motor 156.

With continued reference to FIG. 1, device 100 includes controller 152. Controller may be communicatively connected to tilting motor 156. Controller 152 may be communicatively connected to panning motor 132. Controller 152 may be communicatively connected to a tilt sensor. Controller 152 may be electrically connected to energy source 136. Controller 152 may be communicatively connected to camera 148.

With continued reference to FIG. 1, controller 152 may include any computing device as described in this disclosure, including without limitation a microcontroller, microprocessor, digital signal processor (DSP) and/or system on a chip (SoC) as described in this disclosure. controller 152 may include, be included in, and/or communicate with a mobile device such as a mobile telephone or smartphone. controller 152 may include a single computing device operating independently, or may include two or more computing device operating in concert, in parallel, sequentially or the like; two or more computing devices may be included together in a single computing device or in two or more computing devices. controller 152 may interface or communicate with one or more additional devices as described below in further detail via a network interface device. Network interface device may be utilized for connecting controller 152 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. controller 152 may include but is not limited to, for example, a computing device or cluster of computing devices in a first location and a second computing device or cluster of computing devices in a second location. controller 152 may include one or more computing devices dedicated to data storage, security, distribution of traffic for load balancing, and the like. controller 152 may distribute one or more computing tasks as described below across a plurality of computing devices of computing device, which may operate in parallel, in series, redundantly, or in any other manner used for distribution of tasks or memory between computing devices. controller 152 may be implemented using a "shared nothing" architecture in which data is cached at the worker, in an embodiment, this may enable scalability of system 100 and/or computing device.

With continued reference to FIG. 1, controller 152 may be designed and/or configured to perform any method, method step, or sequence of method steps in any embodiment described in this disclosure, in any order and with any degree of repetition. For instance, controller 152 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 152 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
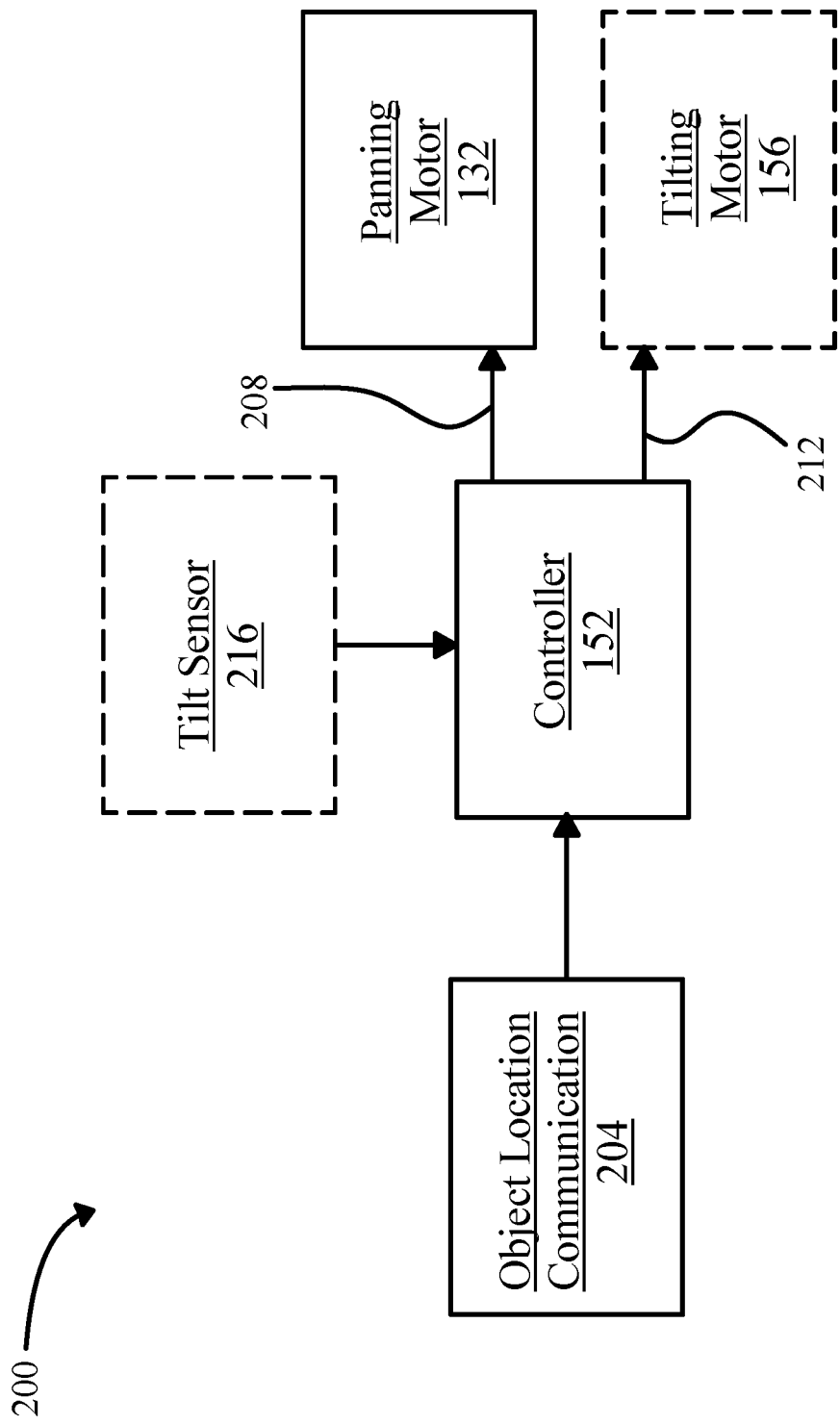
FIG. 2 is a block diagram of an exemplary control system.

Referring now to FIG. 2, an exemplary control system for an autonomous tracking device 200 is depicted. Controller 152 contains circuitry configured to receive an object location communication 204 as a function of a digitized image. In some embodiments, the object location communication may be received from a mobile device, as described with reference to FIG. 5. In some embodiments, the object location communication may be received from another computing device within base 104. In some embodiments the object location communication may be received from a remote device. For the purposes of this disclosure, a "remote device" is a computing device that is not part of not in contact with device 100. Controller may communicate with the remote device or the mobile device using wireless communication. Wireless communication may include 3G, 4G, cellular data, satellite communication, Wi-Fi, and the like. Additionally, wireless communication may include Bluetooth. Bluetooth is a wireless communication standard that uses signals within the frequency range of 2.4 to 2.485 GHz to transfer data between devices wirelessly. Bluetooth utilizes frequency hopping, meaning that the Bluetooth signal switches between different frequencies regularly. For example, the Bluetooth signal may switch between frequencies at a rate of 1600 times per second. Bluetooth may also use "packet switching" in order to facilitate communication between two or more devices. When using packet switching, a first device the data in a series of small packets, wherein each of the small packets contains an order number. Each of the packets finds the fastest way to a second device and are reordered by the second device based on the order number once the packets have all been received.

With continued reference to FIG. 2, in some embodiments, the object location communication may be generated using computer vision methods. In some embodiments, the object location communication may be generated by controller 152, a mobile device, another computing device located in base 104, or a remote device. Processes and configuration for generation of object location communication using computer vision methods, which may be performed in any combination by any computing devices described herein or combination thereof, are described in further detail below.

With continued reference to FIG. 2, controller 152 contains circuitry configuring controller 152 to generate a panning motor control signal 208 as a function of the object location communication 204; generation may include reception from another device and/or generation at and/or by control circuit, using any process and/or process step or steps as described in this disclosure. A panning motor control signal may include any electronic signal, voltage, current, or the like that commands, drives, and/or powers panning motor to rotate a rotor or shaft, or body 108 by some angular displacement, number of steps, at some speed, and/or for some amount of time. As a non-limiting example, generating a panning motor control signal 208 may include generating a panning motor control signal 208 that causes panning motor 132 to rotate to keep object within the field of view 172 of camera 148. Controller 152 contains circuitry configuring controller 152 send a panning motor control signal 208 to the panning motor 132. Controller 152 may transmit panning motor control signal 208 using either wired or wireless communication, control of one or more electrical parameters in a circuit including electric energy source and motor, or the like. In some embodiments, controller 152 may contain circuitry configuring controller 152 to generate a tilting motor control signal 212 as a function of the object location communication 204; generation may include reception from another device and/or generation at and/or by control circuit, using any process and/or process step or steps as described in this disclosure. Tilting motor control signal 212 may have any form suitable for a panning motor control signal and may cause tilting motor 156 and/or stand to rotate about a horizontal axis of rotation by some angular displacement, number of steps, at some speed, and/or for some amount of time. As a non-limiting example, generating a tilting motor control signal 212 may include generating a tilting motor control signal 212 that causes tilting motor 156 to rotate to keep the object within the field of view 172 of camera 148. In some embodiments, controller 152 may contain circuitry configuring controller 152 to send a tilting motor control signal 212 to tilting motor 156. wherein tilting motor control signal 212 causes tilting motor 156 to rotate stand 160 relative to base 104, such that the object remains in field of view 172 of camera 148.

With continued reference to FIG. 2, in some embodiments, controller 152 may receive an angle of tilt measurement from tilt sensor 216. In some embodiments, controller 152 may use the angle of tilt measurement in order to assist in calculating tilting motor control signal 212.

Figure 3:
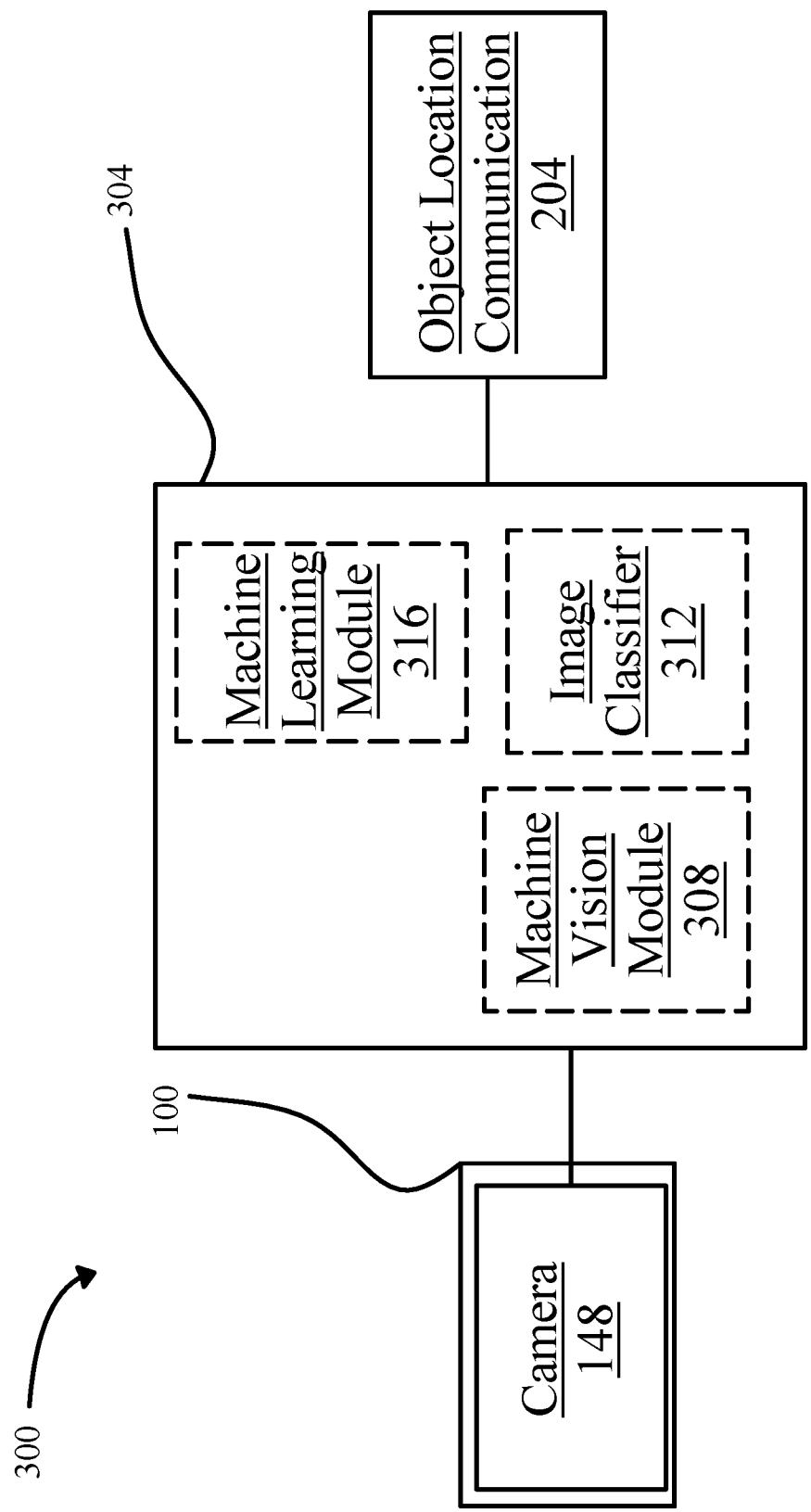
FIG. 3 is a block diagram of an exemplary system for generating an object location communication.

Referring now to FIG. 3, an exemplary system for generating an object location communication 300 is shown. System 300 may include a computing device 304. In some embodiments, computing device 304 may be used to generate object location communication 204.

With continued reference to FIG. 3, in some embodiments, computing device 304 may receive a digitized image from camera 148. Camera 148, as discussed, is a component of device 100. Computing device 304 may be communicatively connected to camera 148, controller 112 and/or device 100; alternatively or additionally, computing device 304 may include, be included in, or be controller 112, camera 148, and/or device 100. In some embodiments, computing device 304 may use wireless communication to communicate with camera 148 and/or device 100. As non-limiting examples, wireless communication may include 3G, 4G, cellular data, satellite communication, radio, Wi-Fi, Bluetooth, or any other wireless communication method disclosed as part of this disclosure. In some embodiments, computing device 304 may receive a digitized image from camera 148 and/or device 100. In some embodiments, the communicative connection between computing device 304 and camera 148 and/or device 100 may be indirect, meaning that an intermediary device may relay the communications. As a non-limiting example, this intermediary device may be a mobile device as described with reference to FIG. 5.

With continued reference to FIG. 3, in some embodiments, computing device 304 may be configured to send object location communication 204 to controller 152 and/or device 100. In some embodiments, computing device 304 may be communicatively connected to controller 152 and/or device 100. In some embodiments, computing device 304 may use wireless communication to communicate with controller 152 and/or device 100. As non-limiting examples, wireless communication may include 3G, 4G, cellular data, satellite communication, radio, Wi-Fi, Bluetooth, or any other wireless communication method disclosed as part of this disclosure. In some embodiments, the communicative connection between computing device 304 and controller 152 and/or device 100 may be indirect, meaning that an intermediary device may relay the communications. As a non-limiting example, this intermediary device may be a mobile device as described with reference to FIG. 5.

With continued reference to FIG. 3, computing device 304 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 304 may include a single computing device operating independently, or may include two or more computing device operating in concert, in parallel, sequentially or the like; two or more computing devices may be included together in a single computing device or in two or more computing devices. computing device 304 may interface or communicate with one or more additional devices as described below in further detail via a network interface device. Network interface device may be utilized for connecting computing device 304 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 304 may include but is not limited to, for example, a computing device or cluster of computing devices in a first location and a second computing device or cluster of computing devices in a second location. computing device 304 may include one or more computing devices dedicated to data storage, security, distribution of traffic for load balancing, and the like. computing device 304 may distribute one or more computing tasks as described below across a plurality of computing devices of computing device, which may operate in parallel, in series, redundantly, or in any other manner used for distribution of tasks or memory between computing devices. computing device 304 may be implemented using a "shared nothing" architecture in which data is cached at the worker, in an embodiment, this may enable scalability of system 100 and/or computing device.

With continued reference to FIG. 3, computing device 304 may be designed and/or configured to perform any method, method step, or sequence of method steps in any embodiment described in this disclosure, in any order and with any degree of repetition. For instance, computing device 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 304 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 3, computing device 304 may include a machine vision module 308. A machine vision module 308 may use images from at least a camera, to make a determination about a scene, space, and/or object. For example, in some cases a machine vision module 308 may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision module 308 may use a classifier, such as any classifier described throughout this disclosure.

With continued reference to FIG. 3, machine vision module 308 may be used to estimate the position of an object, wherein the object is in the digitized image provided by camera 148. The position of the object may include as non-limiting examples, X and Y coordinates for the object's position in the plane of the digitized image. Additionally, in some embodiments, the position of the object may include a Z coordinate value, wherein the Z coordinate value represents the objects distance from camera 148 In some embodiments, machine vision module 308 may use pose estimation. For example, wherein, as a non-limiting example, the object is a human, machine vision module 308 may identify certain parts of the human's body. As a non-limiting example, machine vision module may identify the location of the human's legs, knees, hands, eyes, and the like.

With continued reference to FIG. 3, computing device 304 may include an image classifier 312. Computing device 304 may be configured to perform image classification using image classifier 312. Image classifier 312 may be communicatively connected to computing device 304. In some embodiments, image classifier 312 may be a component or module of computing device 304. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 304 and/or another computing device may generate a classifier using a classification algorithm, defined as a process whereby a computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, Fisher's linear discriminant, quadratic classifiers, decision trees, boosted trees, random forest classifiers, kernel estimation, learning vector quantization, and/or neural network-based classifiers.

Still referring to FIG. 3, image classifier 312 may be generated, as a non-limiting example, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. A computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, image classifier 312 may be generated using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 3, in some embodiments, computing device 304 may be configured to train image classifier 312 or any machine learning module (e.g., machine learning module 1400 in FIG. 14) using any classification algorithm described above operating on training data. "Training data," as used herein, is data containing correlations that a machine-learning process, such as a classifier, may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and further referring to FIG. 3, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. Training data used to train image classifier 312 may include a plurality of entries, each including attributes of an image such as a portion of a frame of a plurality of frames, and/or a shape detected therein, which may be used to classify the image to other images in training data.

With continued reference to FIG. 3, for example, image classifier 312 may be trained using a plurality of images. In some embodiments, image classifier 312 may be trained to classify the subjects of the images. As non-limiting examples, the subjects could be classified as humans, animals, cats, dogs, pets, inanimate objects, plants, and the like. In some embodiments, image classifier 312 may be trained to classify the pose of the subject of the photographs. As non-limiting examples, the poses could be running, walking, leaning, moving from standing to sitting, moving from sitting to standing, jumping, swaying, and the like.

With continued reference to FIG. 3, computing device 304 may include a machine learning module 316. Machine learning module 316 may be consistent with machine learning module 1400 disclosed with reference to FIG. 14. In some embodiments, machine learning module 316 may receive digitized images from camera 148. In some embodiments, machine learning module 316 may receive information from the machine vision module 308 and image classifier 312 as input. Machine learning module 316 may be configured to generate object location communication 204 based on these inputs.

Figure 5:
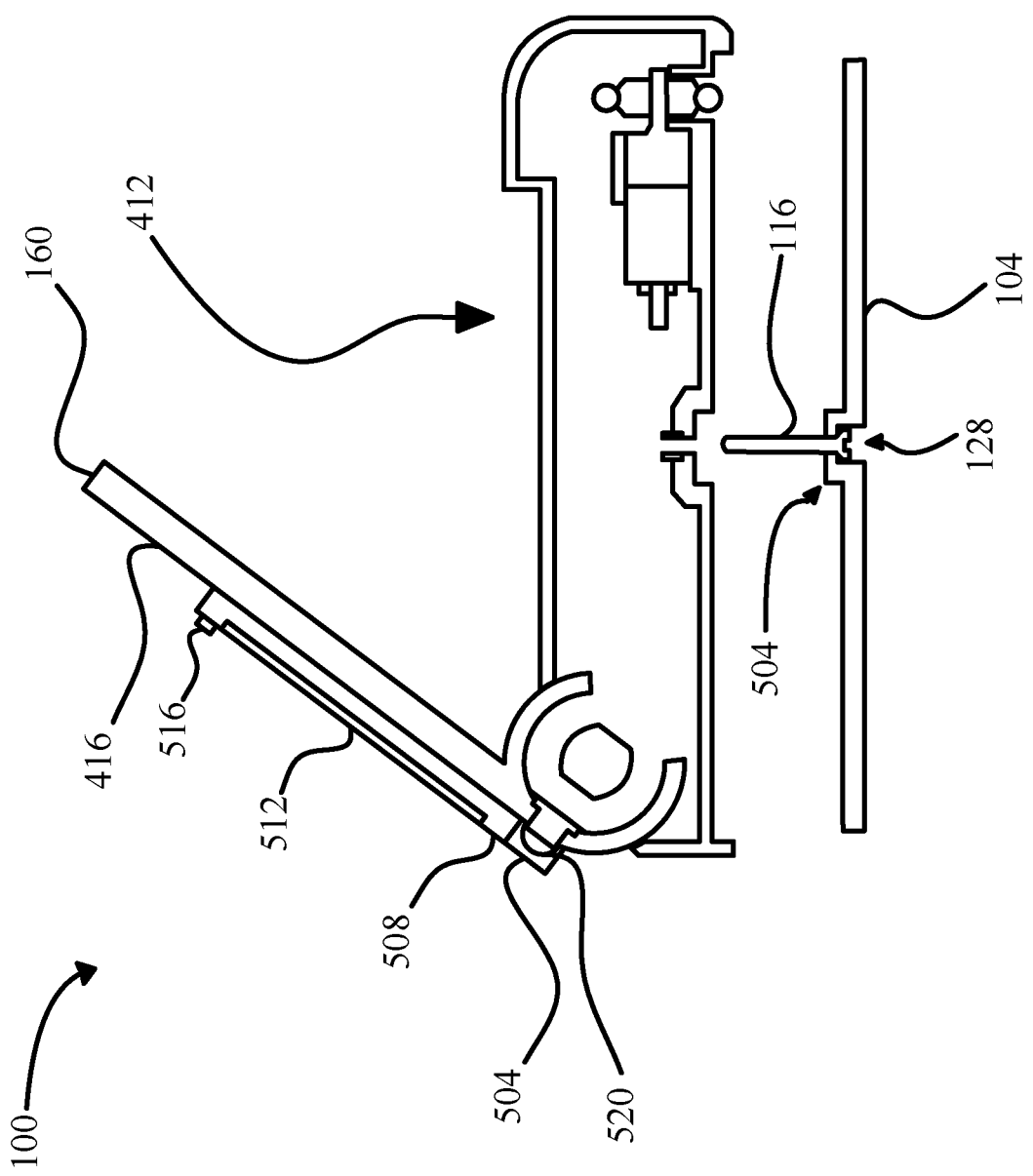
FIG. 5 is an illustration of an exemplary embodiment of an autonomous tracking device with a mobile device.

Computing device 304 may be a mobile device as disclosed with reference to FIG. 5. In some embodiments, computing device 304 may be disposed within body 108 of device 100. In yet other embodiments, computing device 304 may be a remote device. In some embodiments, computing device 304 may be a server.

Figure 4:
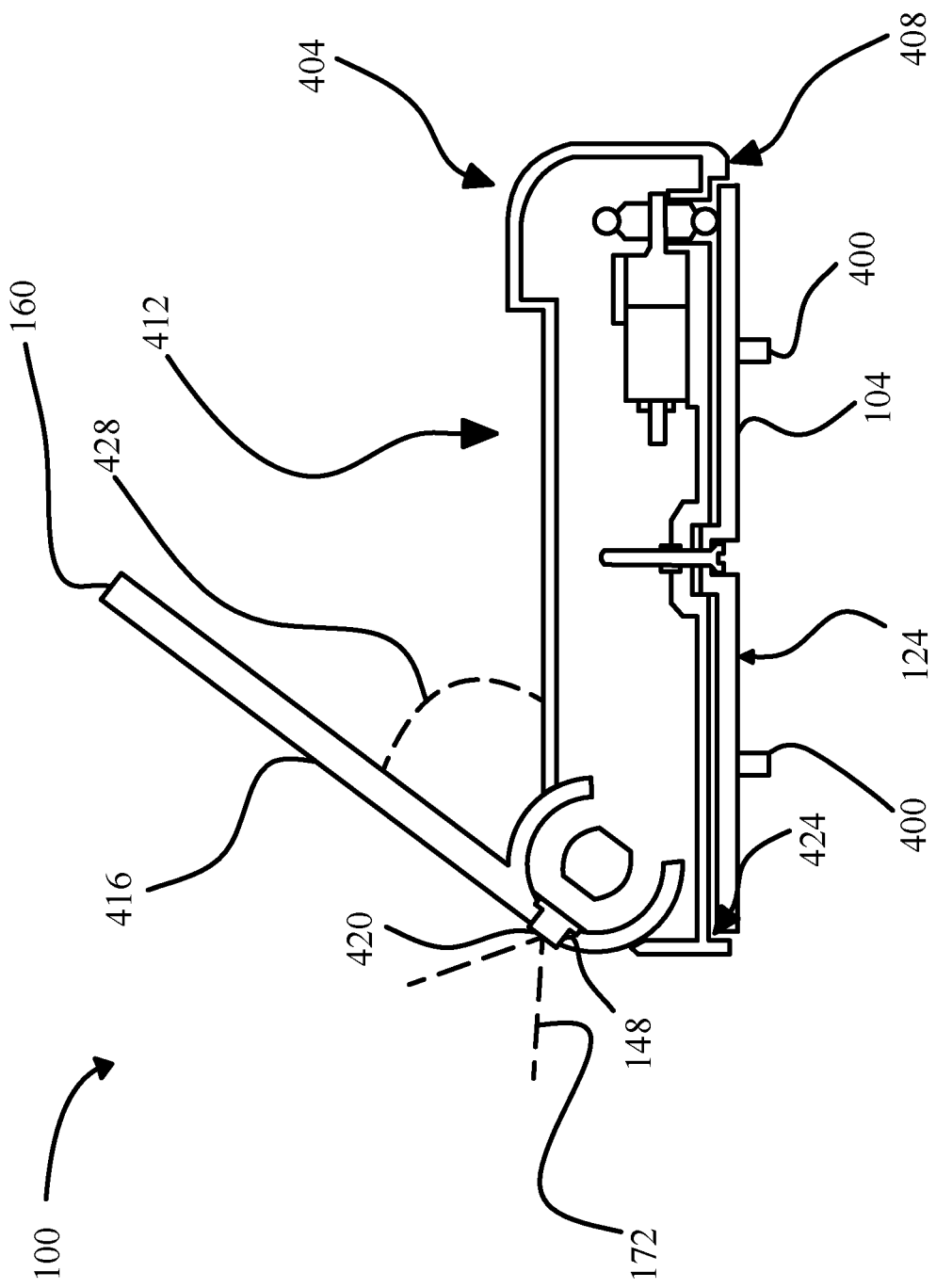
FIG. 4 is an illustration of another exemplary embodiment of an autonomous tracking device.

Referring now to FIG. 4, an exemplary embodiment of an autonomous tracking device 100 is depicted. In some embodiments, the bottom face 124 of base 104 may include feet 400. In some embodiments, feet 400 may be orthogonal protrusions from the bottom face 124 of base 104 on which base 104 may rest. The feet 400 may allow the bottom face 124 of base 104 to not contact surface 112, while device 100 is on surface 112. Feet 400 may have a variety of shapes. As non-limiting example, Feet 400 may be rectangular, circular, oval shaped, share, trapezoidal, and the like. In some embodiments, feet 400 may be rubber. This may, for example, prevent base 104 from slipping when placed on slippery surfaces. In some embodiments, feet 400 may be made entirely of rubber. In some embodiments, feet 400 may be coated in rubber. As a non-limiting example, coating may cover all of the exposed surface area of feet 400. As another non-limiting example, the coating may cover only the portion of feet 400 designed to come into contact with surface 112.

With continued reference to FIG. 4, body 108, in some embodiments, may include a top side 404 and a bottom side 408. Top side 404 may define a stand recess 412. In some embodiments, stand recess 412 may be accommodate at least a portion of stand 160 when stand 160 is in its stowed position. In some embodiments, stand recess 412 may be sized to accommodate all of stand 160 except for tilting motor housing 176. In some embodiments, stand recess 412 may be sized to accommodate all of stand 160.

With continued reference to FIG. 4, when stand 160 is in the stowed position, at least a portion of stand 160 is disposed in stand recess 412. In some embodiments, when stand 160 is in the stowed position, all of stand 160 except for tilting motor housing 176 is disposed in stand recess 412. In some embodiments, when stand 160 is in the stowed position, all of stand 160 is disposed in stand recess 412. In some embodiments, when stand 160 is in the stowed position, a front face 416 of stand 160 may be flush with the portion of top side 404 of body 108 surrounding stand recess 412.

With continued reference, to FIG. 4, the front face 416 of stand 160 is the face of stand 160 that points away from base 104 when stand 160 is in the stowed position. In some embodiments, camera 148 may include a lens 420. For the purpose of this disclosure a "lens" of a camera is an optical lens or assembly of lenses used to make images of objects either on photographic film or on other media capable of storing an image chemically or electronically. In some embodiments, lens 420 of camera 148 may be flush with front face 416 of stand 160. In some embodiments, camera 148 may be located on front face 416 of stand 160. In some embodiments, camera 148 may be attached to stand 160. In some embodiments, camera 148 may be attached to stand 160 such that camera 148 rotates with stand 160.

With continued reference to FIG. 4, bottom side 408 of body 108 may define a base recess 424. In some embodiments, at least a portion of base 104 may be disposed within base recess 424. In some embodiments, at least a portion of base 104 may be disposed within base recess 424 when device 100 is sitting on base 104. In some embodiments, all of base 104 may be disposed within base recess 424. In some embodiments, base recess 424 may be sized to accommodate at least a portion of base 104. In some embodiments, base recess 424 may be sized to accommodate all of base 104. In some embodiments, base 104 may be flush with the portions of bottom side 408 surrounding base recess 424. In some embodiments, base 104 may be flush with the portions of bottom side 408 surrounding base recess 424 when device 100 is sitting on base 104.

With continued reference to FIG. 4, an exemplary angle of tilt 428 that may be measured by a tilt sensor as disclosed in this disclosure. In some embodiments, tilt sensor 216 may measure an angle difference instead of an angle of tilt 428.

Referring now to FIG. 5, an exemplary embodiment of device 100 is shown. In FIG. 5, some portions of device 100 are shown separated from the rest. This is for illustration purposes only.

With continued reference to FIG. 5, base 104, in some embodiment, may include a raised portion 500. Raised portion 500 may be oriented around vertical axle 116. In some embodiments, raised portion 500 may exist in order to accommodate vertical axle recess 128 while still providing radial support for vertical axle 116.

With continued reference to FIG. 5, stand 160 includes a retention device 504. In some embodiments, retention device 504 may be disposed on front face 416 of stand 160. A "retention device" as used in this disclosure is a component and/or piece of stand 160 that prevents a mobile device placed thereon from falling off. Retention device 504 is configured to hold a mobile device 508 as disclosed in this disclosure. In some embodiments, retention device 504 may include a plurality of protrusions. As a non-limiting example, retention device 504 may include two protrusions. In some embodiments, the protrusions may be perpendicular to front face 416 of stand 160. The protrusions may have a variety of shapes. As non-limiting example, the protrusions may be rectangular, circular, oval shaped, share, trapezoidal, and the like. In some embodiments, the protrusions may be rubber. This may, for example, prevent the mobile device from slipping when placed on stand 160. In some embodiments, the protrusions may be made entirely of rubber. In some embodiments, the protrusions may be coated in rubber. As a non-limiting example, coating may cover all of the exposed surface area of the protrusions. As another non-limiting example, the coating may cover only the portion of the protrusions designed to come into contact with the mobile device 508. In some embodiments, retention device 504 may include a groove set into front face 416 of stand 160. In some embodiments, this groove may be configured to accept at least an edge of a mobile device 508. In some embodiments, retention device 504 may include a clap, wherein the clamping portions of the clamp secure mobile device 508. In some embodiments, retention device 504 may include a suction cup, wherein the suction cup, when engaged holds mobile device 508 to front face 416 of stand 160. A person of ordinary skill in the art, after reviewing the entirety of this disclosure, would appreciate that a variety of retention device 504 may be suitable for this application.

With continued reference to FIG. 5, mobile device 508 may be consistent with any computing device disclosed as part of this disclosure. In some embodiments, mobile device 508 may be a personal computing device. As non-limiting example, computing device may be a smartphone, tablet computer, laptop, iPod, and the like. In some embodiments, mobile device 508 may include an energy source. The energy source may comprise one or more electrochemical cells. In some embodiments, the energy source may comprise lithium-ion batteries. In some embodiments, mobile device 508 may be attached to stand 160. As a non-limiting example, mobile device 508 may be attached to stand 160 using a fastener, such as nails, screws, adhesive, and the like. In some embodiments, mobile device 508 may engage with retention device 504. In some embodiments, mobile device 508 may engage with retention device 504 without being attached to stand 160.

With continued reference to FIG. 5, mobile device 508 may include a display 512. A "display," for the purposes of this disclosure, is an electronic device for the visual presentation of data, such as in the form of still images, or video. Display 512 may be a liquid crystal display (LCD), plasma display, cathode ray tube (CRT) display, light-emitting diode (LED) display, organic light-emitting diode (OLED) display, and the like. Display 512 may be controlled by a computing device. Display 512 may be used to display any relevant data. As a non-limiting example, display 512 may be used to display video feeds from other participants in a video conference. As another non-limiting example, display 512 may be used to display an internet browser window. As another non-limiting example, display 512 may be used to display presentation notes. A person of ordinary skill in the art would appreciate, after having reviewed the entirety of this disclosure, that display 512 may be used to display a nearly limitless variety of data. Display 512 may have a variety of display orientations. In some embodiments, display 512 may have a portrait orientation, wherein a portrait orientation refers to a display that is taller than it is wide. In some embodiments, display 512 may have a landscape orientation, wherein a landscape orientation refers to a display that is wider than it is tall. Display 512 may have a variety of display resolutions. A "display resolution," for the purposes of this disclosure, represents the number of pixels in the display in the horizontal direction and the number of pixels in the display in the vertical direction. Display 512 may have a variety of aspect ratios. An "aspect ratio," for the purposes of this disclosure, is a ratio of an image's width to its height. As a non-limiting example, display 512 may have a square aspect ratio (1:1). As another non-limiting example, display 512 may have a 4:3 aspect ratio. As another non-limiting example, display 512 may have a 16:9 aspect ratio. As yet another non-limiting example, display 512 may have a 9:16 aspect ratio. A person of ordinary skill in the art would appreciate that, after having reviewed the entirety of this disclosure, display 512 may have a variety of display resolutions and aspect ratios depending on the implementation sought.

With continued reference to FIG. 5, in some embodiments, mobile device 508 may be wirelessly charged by energy source 136. In some embodiments, mobile device 508 may be wireless charged by energy source 136 using a wireless charging device. In some embodiments, mobile device 508 may be wirelessly charged using radio charging. In some embodiments, mobile device 508 may be wirelessly charged using inductive charging. Inductive charging, in some embodiments, may be referred to as near-field charging. In some embodiments, mobile device 508 may be wirelessly charged using resonance charging. The wireless charging device may be chosen such that it is compatible with the method of wireless charging chosen. Depending on the wireless charging method chosen, the wireless charging device will need to be located within a certain range of mobile device 508 in order to wirelessly charge mobile device 508. For example, radio charging has a larger range than inductance charging. Wireless charging device may be located in a variety of locations. For example, in some embodiments, wireless charging device may be located in stand 160. In some embodiments, wireless charging device may be located in body 108. The location of wireless charging device may be chosen depending on the wireless charging method chosen; for example, if using radio charging, wireless charging device may be located in body 108. On the other hand, if inductance charging is chosen, wireless charging device, in some embodiments, may be located in stand 160 such that wireless charging device is located adjacent to mobile device 508 when mobile device is sitting in stand 160. This may be desirable, for example, because of the lower range of inductance charging.

With continued reference to FIG. 5, in some embodiments, mobile device 508 may include a mobile device camera 516. The mobile device camera 516 may be disposed on the front face of mobile device 508. Mobile device camera 516 may be consistent with any camera disclosed as part of this disclosure.

With continued reference to FIG. 5, in some embodiments, stand 160 may include a hinge 520. Hinge 520 may be attached to stand 160. Hinge 520 may be connected to retention device 504. Hinge 520 may be configured to move retention device 504 between a stowed position and an unstowed position. In the stowed position, in some embodiments, retention device 504 may be folded flush against front face 416 of stand 160. In the stowed position, in other embodiments, retention device 504 may be folded such that retention device is received into a complimentary depression in stand 160. In these embodiments, when retention device 504 is in the stowed position, it may fold entirely into stand 160 such that the top of retention device is flush with front face 416 of stand 160.

Figure 6:
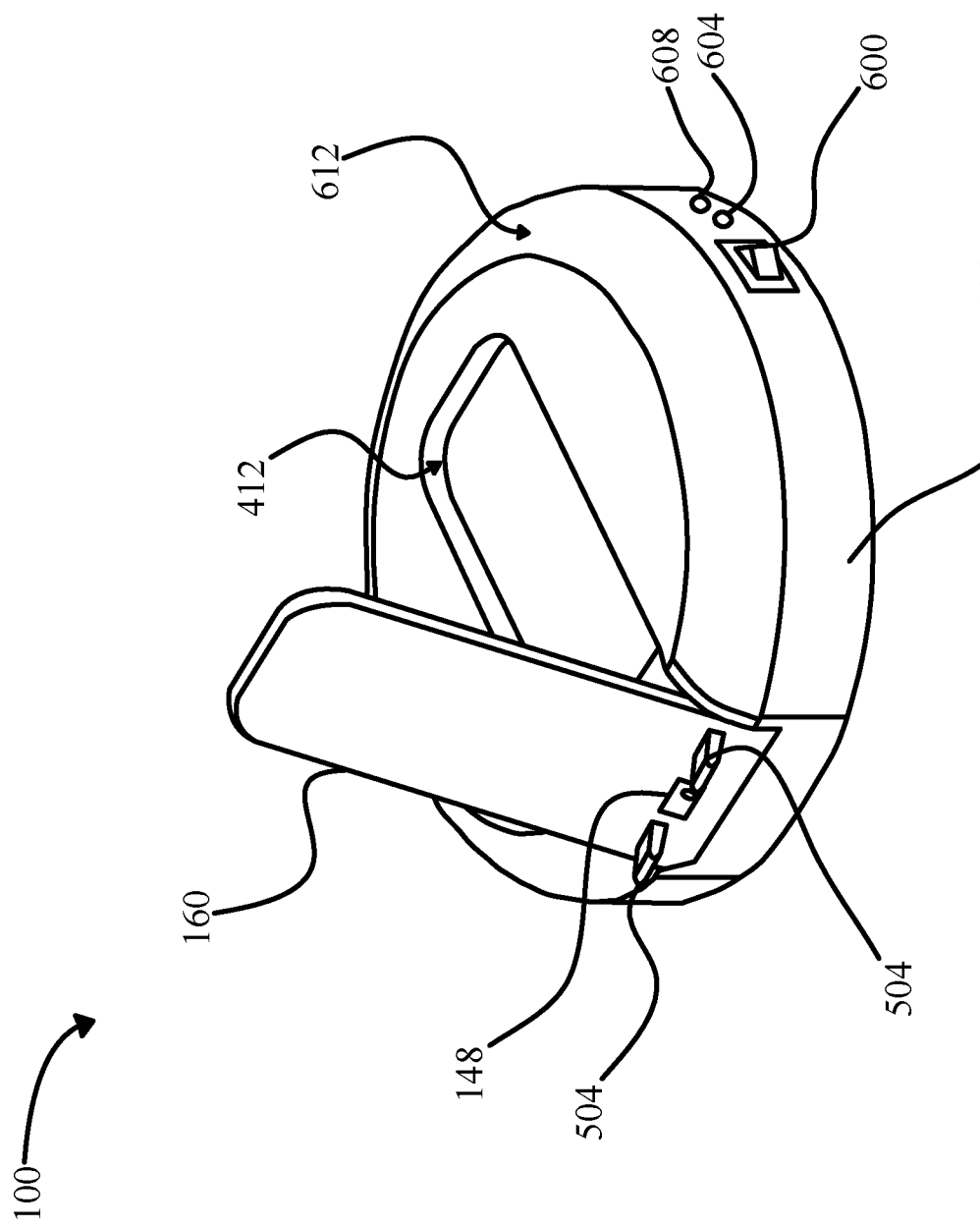
FIG. 6 is a perspective view of an exemplary embodiment of an autonomous tracking device.

Now referring to FIG. 6, a prospective view of device 100 is depicted. Device 100 further includes a power switch 600. Power switch 600 may be a component of base 104. In some embodiments, power switch 600 may be disposed on the side of base 104. In some embodiments, power switch 600 may be a rocker switch having two positions. The first position may correspond to turning device 100 "off." The second position may correspond to turning device 100 "on." In some embodiments, power switch 600 may be a button. In some embodiments, power switch 600 may be a dial. In some embodiments, power switch 600 may be electrically connected to controller 152. In some embodiments, power switch 600 may be configured to connect and disconnect controller 152 from energy source 136.

With continued reference to FIG. 6, device 100 may further include one or more light emitting diodes (LEDs). For the purposes of this disclosure, an "LED" is a semiconductor light source that emits light when current flows through it. The LEDs may be any color such as, as non-limiting examples, red, blue, green, orange, and the like. In some embodiments, one of the one or more LEDs may be a low battery LED 604. The low battery LED 604 may illuminate when the energy remaining in energy source 136 falls below a threshold value. The threshold value, as non-limiting embodiments, may be 33%, 25%, 20%, 10%, and/or 5%. In some embodiments, low battery LED 604 may be electrically connected to controller 152. In some embodiments, controller 152 may monitor the energy remaining in energy source 136 and illuminate low battery LED 604 when the energy remaining in energy source 136 falls below the threshold value. In some embodiments, one LED of the at least one LED may be a power LED 608. Power LED may illuminate when device 100 is powered on. Power LED 608 may be turned off when device 100 is powered off. Power LED 608 may be electrically connected to controller 152. Controller 152 may turn on or off power LED 608 depending on whether device 100 is turned on or off.

With continued reference to FIG. 6, in some embodiments, base 104 may include a curved edge 612. In some embodiments, curved edge 612 may be disposed on base 104 where the sides of base 104 intersect with top side 404 of base 104. Curved edge 612 may have a variety of radii of curvature. In some embodiments, curved edge 612 may allow for device 100 to be easier to handle by a user by eliminating sharp edges.

Figure 7:
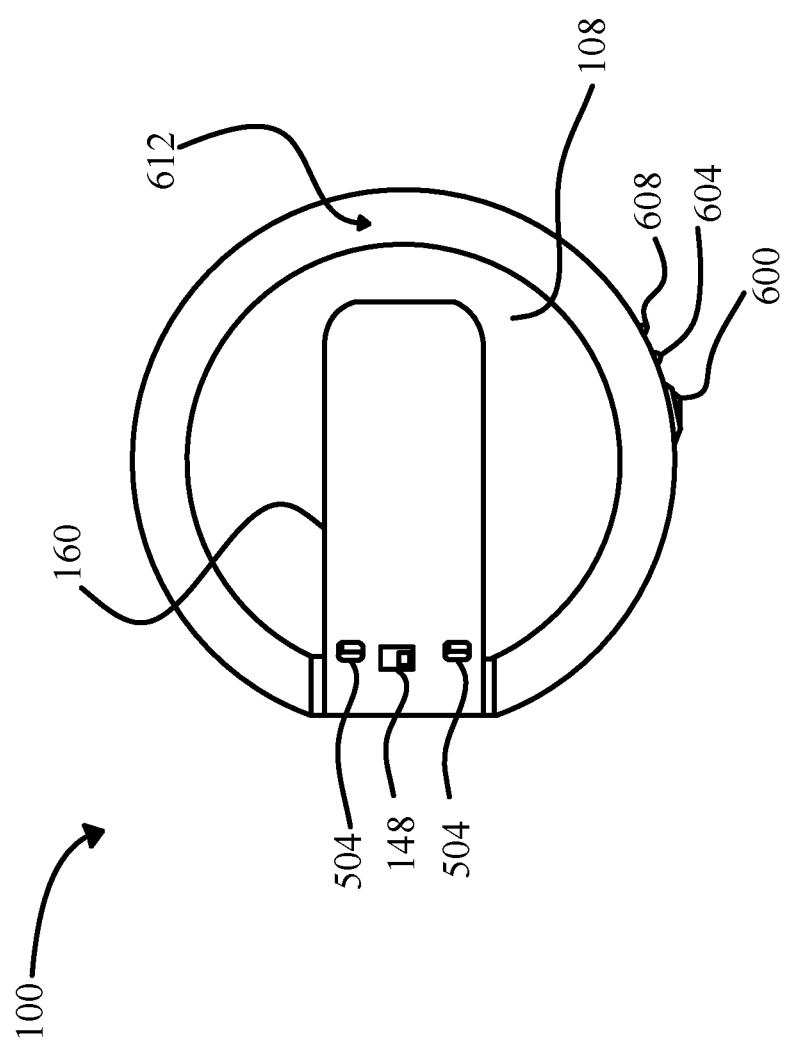
FIG. 7 is a top view of an exemplary embodiment of an autonomous tracking device.

Referring now to FIG. 7, a top-down view of device 100 is depicted. FIG. 7 includes elements that have already been described as part of this disclosure.

Figure 8:
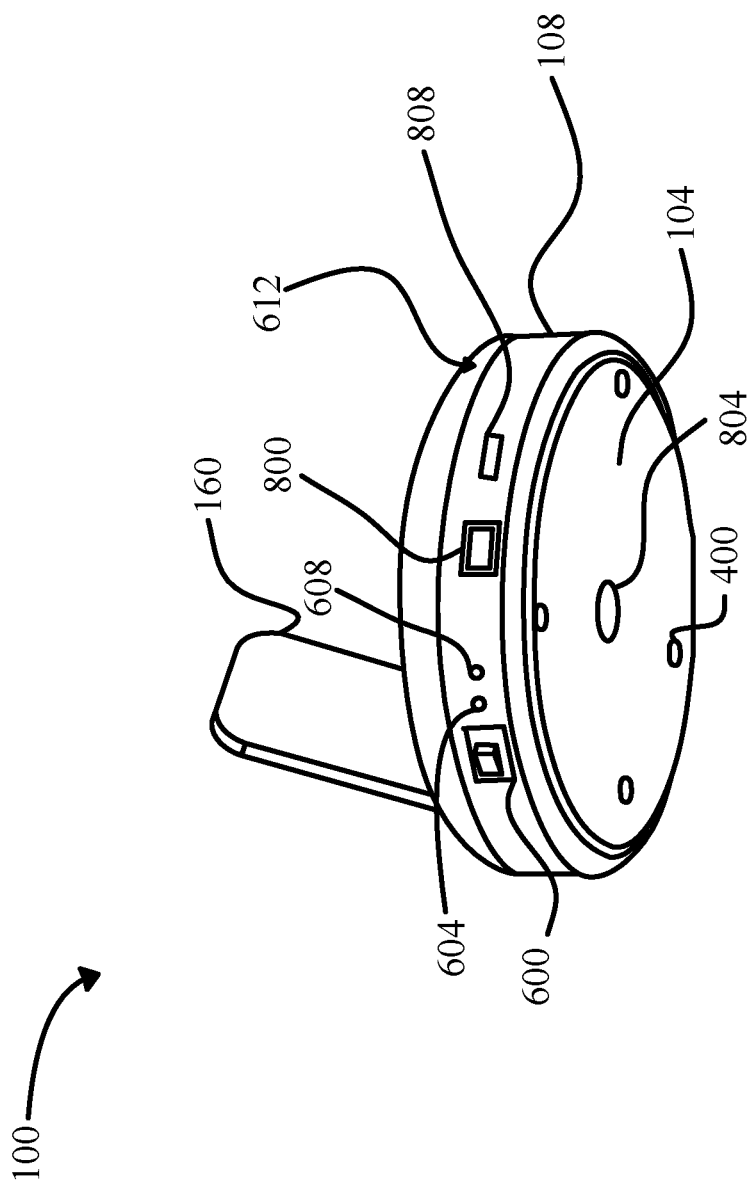
FIG. 8 is a perspective view of an exemplary embodiment of an autonomous tracking device showing the base of the device.

Referring now to FIG. 8, a second profile view of device 100 is illustrated. In some embodiments, body 108 may include a power port 800. In some embodiments, power port 800 may be electrically connected to energy source 136. In some embodiments, power port 800 may be configured to accept a USB plug. By plugging a USB plug into power port 800, a user may charge energy source 136 and/or device 100. In some embodiments, energy source 136 and/or device 100 may be configured to charge using 5V DC power. A person of ordinary skill in the art, after reviewing the entirety of this disclosure, would appreciate that power port 800 may be configured to accept a wide variety of charging plugs depending on the standard chosen. A person of ordinary skill in the art, after having reviewed the entity of this disclosure, would appreciate that energy source 136 and/or device 100 may be configured to charge using a variety of power standards.

With continued reference to FIG. 8, base 104 may include a fixation device 804. Fixation device 804 may be disposed on the bottom face 124 of base 104. Fixation device 804 may serve to removably attach device 100 to surface 112. As a non-limiting example, fixation device 804 may include a suction cup. As a non-limiting example, fixation device 804 may include adhesive. As another non-limiting example, fixation device may include a piece of VELCRO (a.k.a. hook and loop). In some embodiments, surface 112 may include a complimentary piece of VELCRO. A person of ordinary skill in the art, after having reviewed the entirety of this disclosure, would appreciate that a variety of devices may be used as a fixation device 804.

With continued reference to FIG. 8, in some embodiments, body 108 may include a mobile device charging port 808. In some embodiments, mobile device charging port 808 may be electrically connected to energy source 136. In some embodiments, mobile device charging port 808 may be configured to accept a charging plug for a mobile device (e.g. mobile device 508). As a non-limiting examples, mobile device charging port 808 may be configured to accept a USB-A plug, USB-B plug, Mini-USB plug, Micro-USB plug, USC-plug, and the like. The charging plug may be part of a charging cable, wherein the charging cable is configured to provide a wired charging connection to mobile device 508. In this manner, mobile device charging port 808 may be configured to provide a wired charging connection to mobile device 508. In some embodiments, mobile device charging port 808 may be used to charge mobile device 508 from energy source 136 when a wired charging connection is formed between mobile device charging port 808 and mobile device 508.

Figure 9:
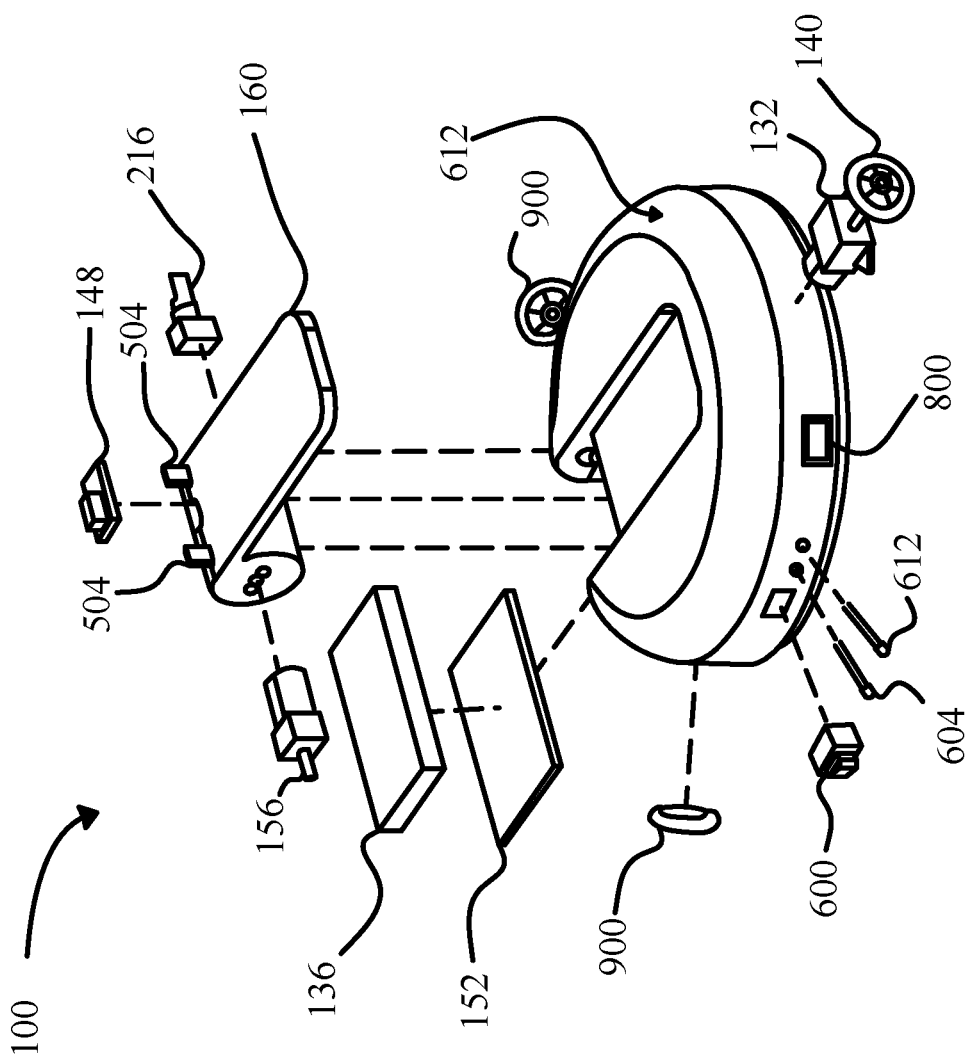
FIG. 9 is an exploded view of an exemplary embodiment of an autonomous tracking device.

Referring now to FIG. 9, an exploded view of device 100 is illustrated. In some embodiments, body 108 may include one or more support wheels 900. Support wheels 900 may be similar in construction to wheel 140. Unlike wheel 140, support wheels 900 are not driven by panning motor 132. Support wheels 900, like wheel 140 may be disposed on the wheel path. In some embodiments, when body 108 rotates with respect to base 104, support wheels 900 may accommodate the rotation by rotating themselves. In some embodiments, support wheels 900 may provide structural support to body 108, by holding body 108 above base 104. Like wheel 140, in some embodiments, support wheels 900 may be circular gears. Additionally, in some embodiments, support wheels 900 may form a rack and pinon system with the wheel path that the support wheels transit. In these embodiments, the wheel path may be a linear gear, with teeth adapted to mate with the teeth of support wheels 900.

With continued reference to FIG. 9, in some embodiments, device 100 may include a tilt sensor 216. A "tilt sensor" for the purposes of this disclosure is a sensor that detects, directly or indirectly, an angular position. In some embodiments, tilt sensor 216 may measure an angle of tilt 428 formed by stand 160 and body. In some embodiments, tilt sensor 216 may be electrically connected to controller 152. In some embodiments, tilt sensor 216 may be communicatively connected to controller 152. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 9, in some embodiments, tilt sensor 216 may be a tilt potentiometer. A potentiometer is a sensor that uses a voltage measurement in order to measure an angle of rotation. A potentiometer may include a sliding contact. The sliding contact may move across a resistor, essentially, creating a variable voltage divider. Depending on the position of the sliding contact, the output voltage of the potentiometer will change. A tilt potentiometer uses this property to measure an angle of tilt.

With continued reference to FIG. 9, in some embodiments, tilt sensor 216 may be a hall effect sensor. A hall effect sensor measures the orientation of a magnetic field using the hall effect. Depending on the orientation of the magnetic field measured, an angle of tilt may be measured. A person of ordinary skill in the art, after having reviewed the entirety of this disclosure, would appreciate that a variety of tilt sensors may be suitable for this application depending on the accuracy, cost, and durability, among other factors, sought.

With continued reference to FIG. 9, in some embodiments, tilt sensor 216 may include an axle that is connected to stand 160. In some embodiments, stand 160 may be connected to body 108 by the axle of tilt sensor 216 and/or the axle of tilting motor 156.

Figure 10:
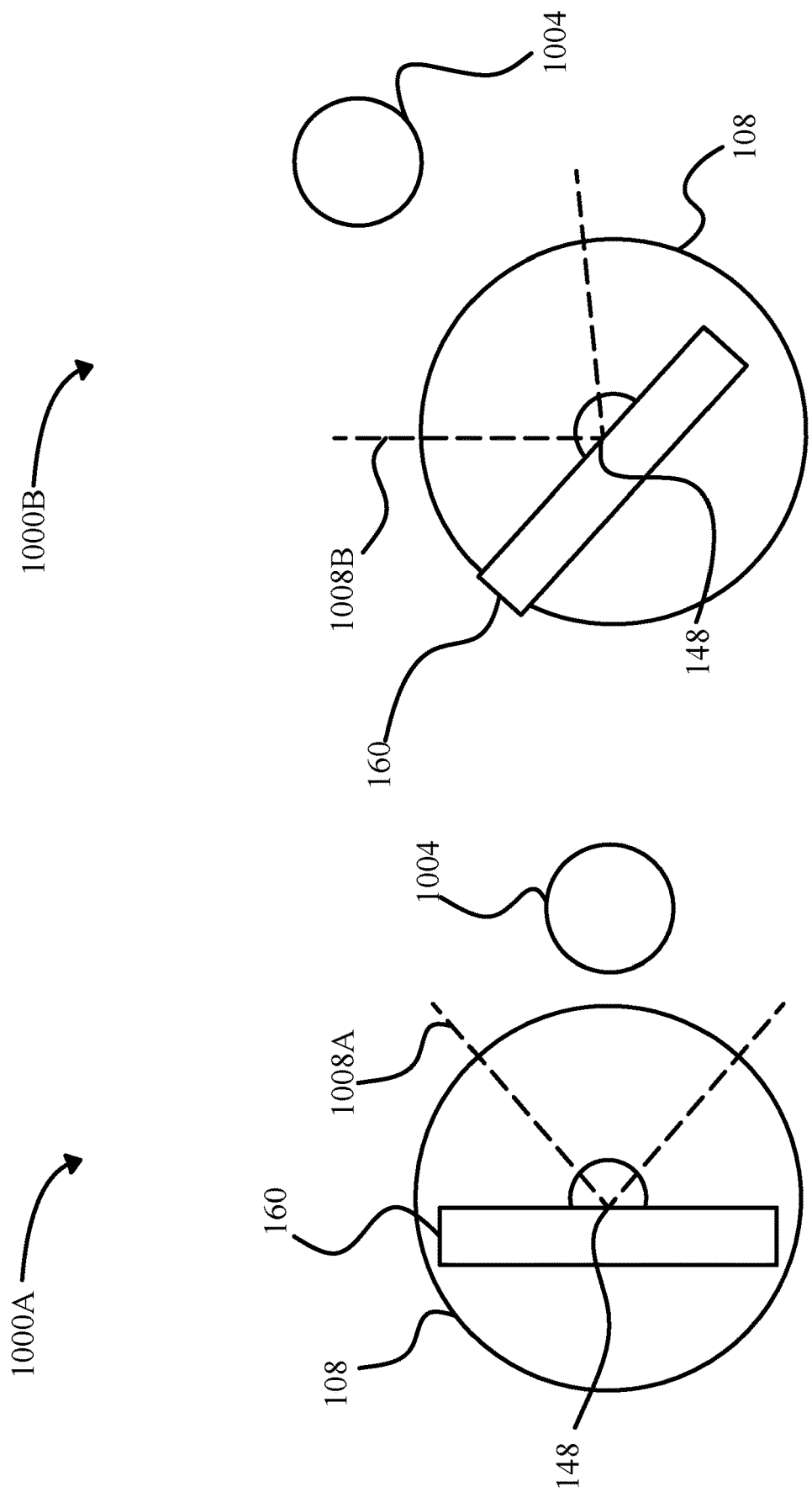
FIG. 10A is an illustration of an exemplary embodiment of a device for an autonomous tracking stand tracking an object in an initial position.
FIG. 10B is an illustration of an exemplary embodiment of a device for an autonomous tracking stand tracking an object in a changed position.

Referring now to FIG. 10A and FIG. 10B, these figures further illustrate the object tracking ability of device 100. FIG. 10A depicts a first orientation 1000A for device 100. In first orientation 1000A, camera 148 is pointed at object 1004. In some embodiments, camera 148 and object 1004 may be consistent with camera 120 and the first object, respectively. The first field of view 1008A of camera 148 is illustrated using dashed lines. As depicted in FIG. 10A, object 1004 is in the first field of view 1008A of camera 148.

Referring now to FIG. 10B, FIG. 10B depicts a second orientation 1000B for device 100. In this second orientation 1000B, object 1004 has changed positions. By actuating one or more of a panning motor 132 and tilting motor 156, camera 148 has been repositioned such that object 1004 remains in the second field of view 1008B of camera 148.

Figure 11:
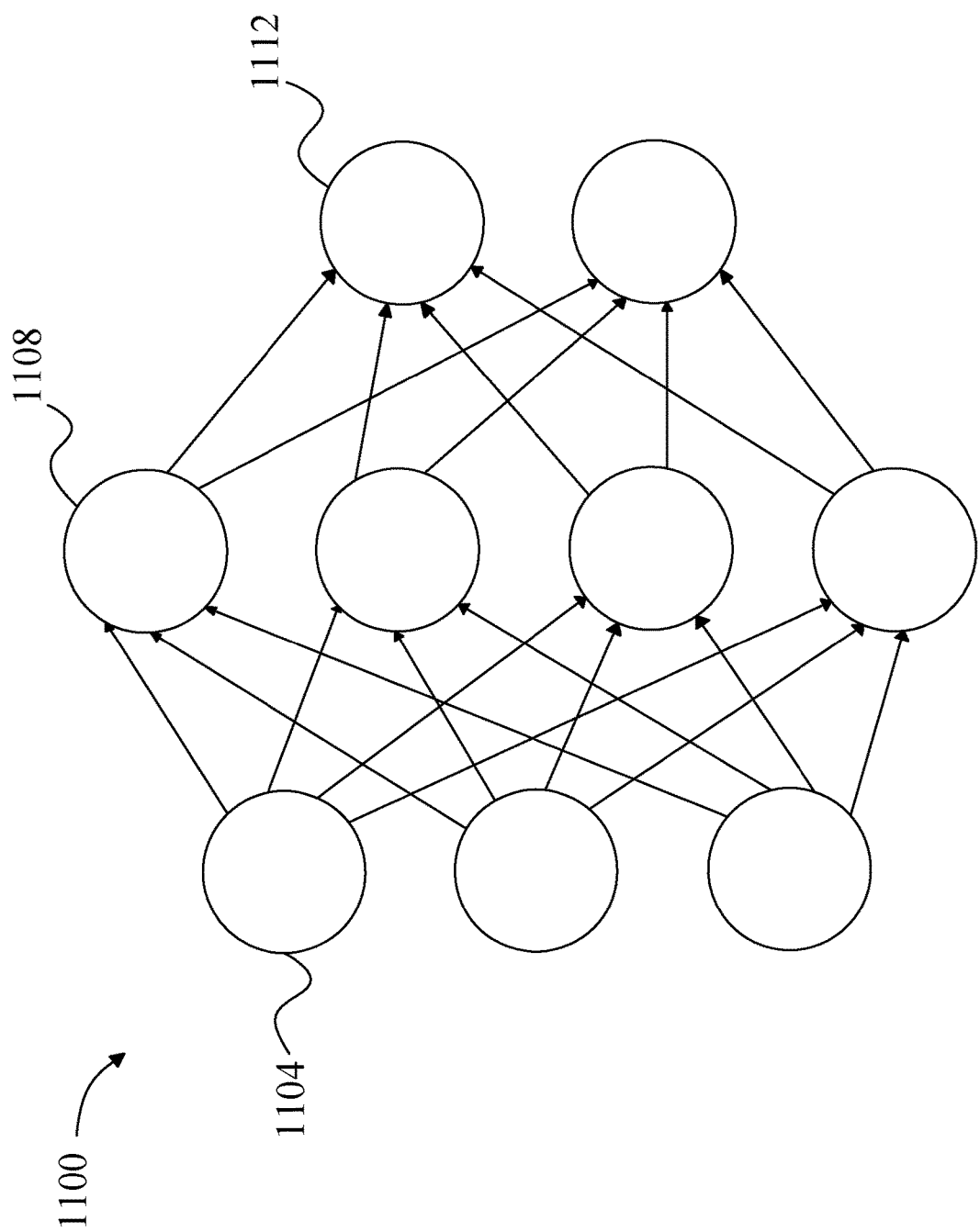
FIG. 11 is an exemplary embodiment of a neural network.

Referring now to FIG. 11, an exemplary embodiment of neural network 1100 is illustrated. A neural network 1100 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 1104, one or more intermediate layers 1108, and an output layer of nodes 1112. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 12:
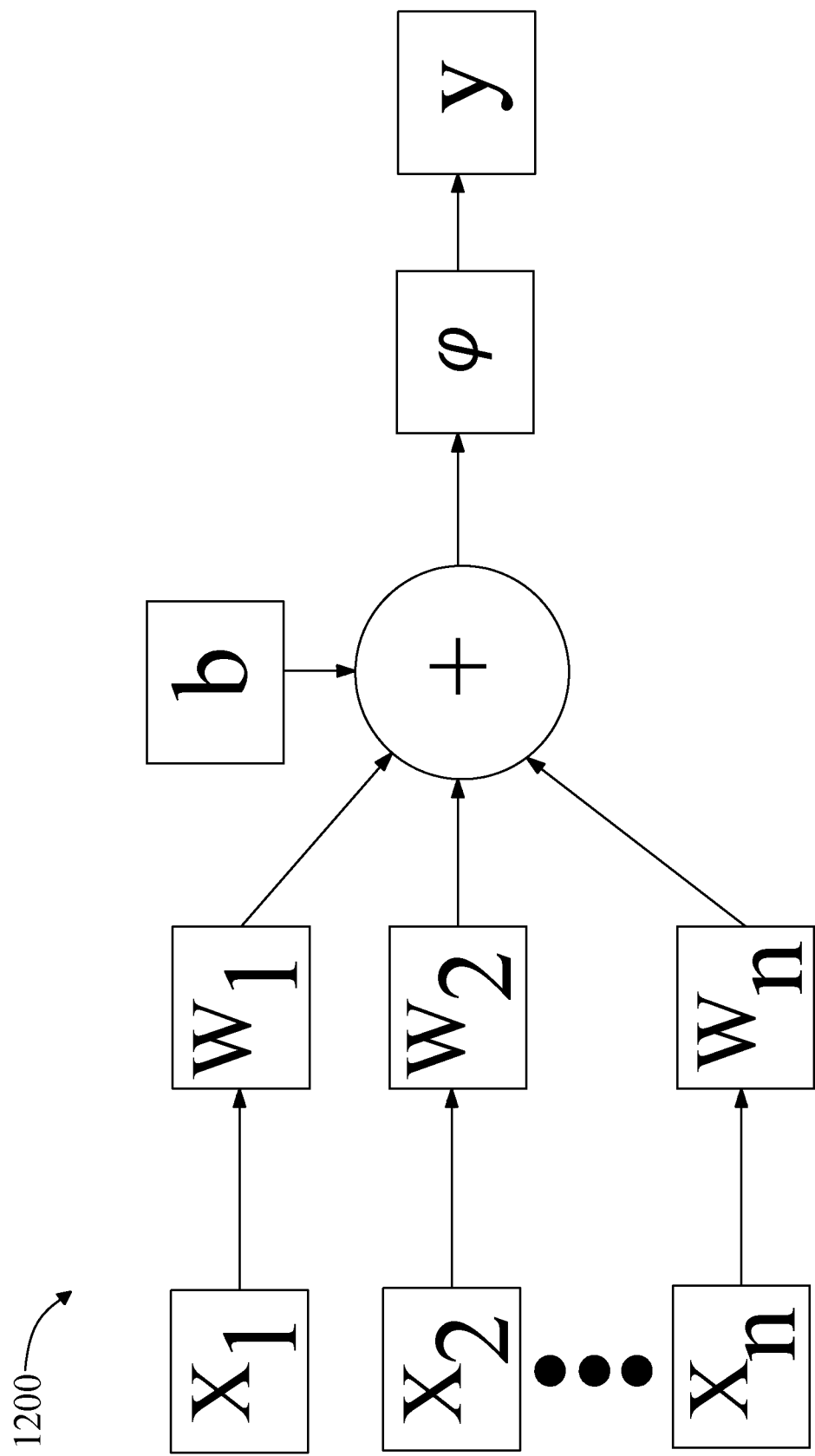
FIG. 12 is an exemplary embodiment of a node of a neural network.

Referring now to FIG. 12, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 13:
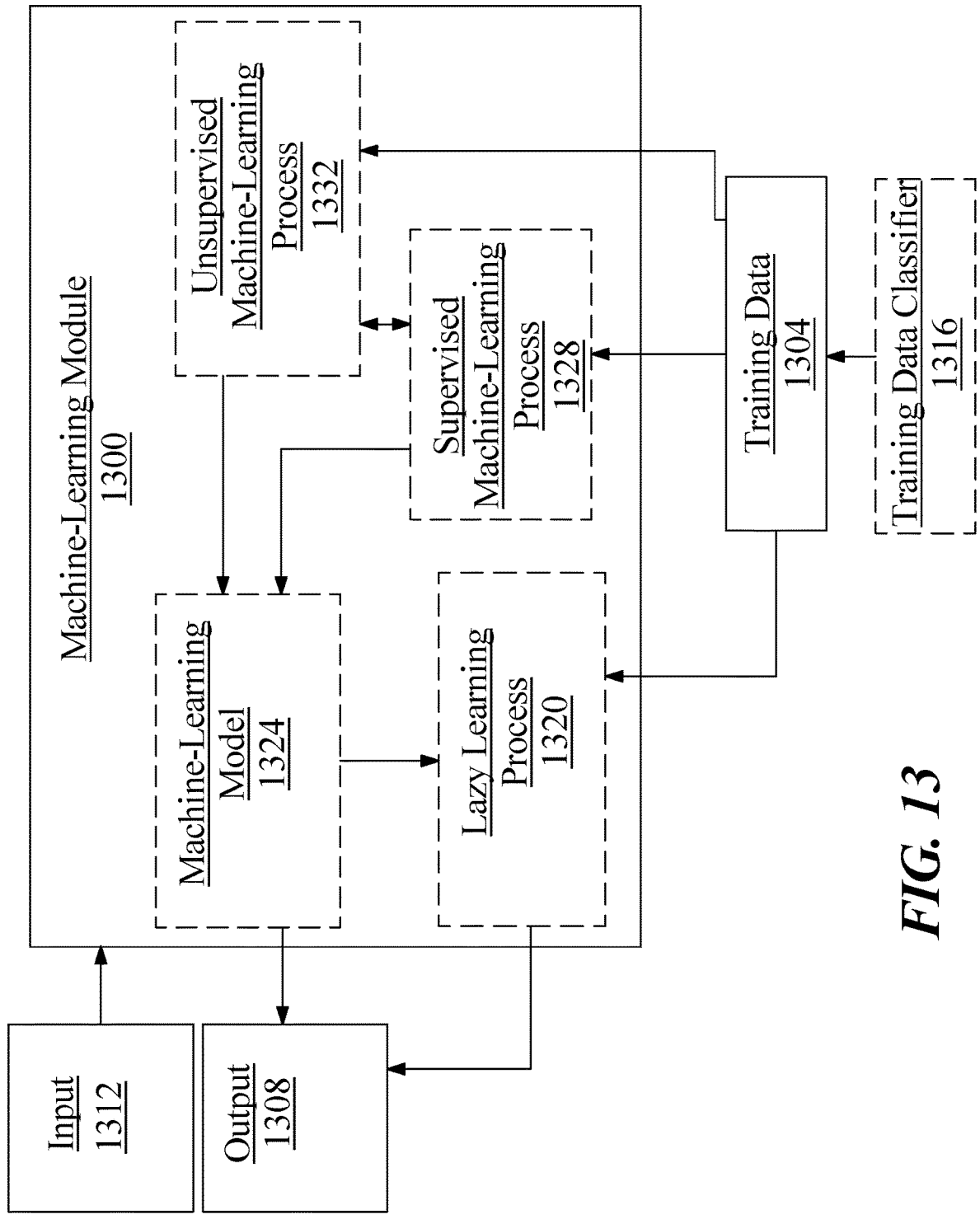
FIG. 13 is an exemplary embodiment of a machine learning model.

Referring now to FIG. 13, an exemplary embodiment of a machine-learning module 1300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1304 to generate an algorithm that will be performed by a computing device/module to produce outputs 1308 given data provided as inputs 1312; this is in contrast to a non-machine learning software program where the commands to be executed are determined in advance by a user and written in a programming language.

Still referring to FIG. 13, "training data," as used herein, is data containing correlations that a machine-learning process may use to model relationships between two or more categories of data elements. For instance, and without limitation, training data 1304 may include a plurality of data entries, each entry representing a set of data elements that were recorded, received, and/or generated together; data elements may be correlated by shared existence in a given data entry, by proximity in a given data entry, or the like. Multiple data entries in training data 1304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1304 according to various correlations; correlations may indicate causative and/or predictive links between categories of data elements, which may be modeled as relationships such as mathematical relationships by machine-learning processes as described in further detail below. Training data 1304 may be formatted and/or organized by categories of data elements, for instance by associating data elements with one or more descriptors corresponding to categories of data elements. As a non-limiting example, training data 1304 may include data entered in standardized forms by persons or processes, such that entry of a given data element in a given field in a form may be mapped to one or more descriptors of categories. Elements in training data 1304 may be linked to descriptors of categories by tags, tokens, or other data elements; for instance, and without limitation, training data 1304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 13, training data 1304 may include one or more elements that are not categorized; that is, training data 1304 may not be formatted or contain descriptors for some elements of data. Machine-learning algorithms and/or other processes may sort training data 1304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1304 to be made applicable for two or more distinct machine-learning algorithms as described in further detail below. Training data 1304 used by machine-learning module 1300 may correlate any input data as described in this disclosure to any output data as described in this disclosure.

Further referring to FIG. 13, training data may be filtered, sorted, and/or selected using one or more supervised and/or unsupervised machine-learning processes and/or models as described in further detail below; such models may include without limitation a training data classifier 1316. Training data classifier 1316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1300 may generate a classifier using a classification algorithm, defined as a processes whereby a computing device and/or any module and/or component operating thereon derives a classifier from training data 1304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1316 may classify elements of training data to the subjects of the images (humans, animals, plants, cars, and the like), or, as another non-limiting example, to the pose of the subject (running, walking, leaning, jumping, pointing, and the like).

Still referring to FIG. 13, machine-learning module 1300 may be configured to perform a lazy-learning process 1320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1304. Heuristic may include selecting some number of highest-ranking associations and/or training data 1304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 13, machine-learning processes as described in this disclosure may be used to generate machine-learning models 1324. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1324 may be generated by creating an artificial neural network, such as a convolutional neural network comprising an input layer of nodes, one or more intermediate layers, and an output layer of nodes. Connections between nodes may be created via the process of "training" the network, in which elements from a training data 1304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 13, machine-learning algorithms may include at least a supervised machine-learning process 1328. At least a supervised machine-learning process 1328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1304. Persons skilled in the art, upon reviewing the entirety of this disclosure, will be aware of various possible variations of at least a supervised machine-learning process 1328 that may be used to determine relation between inputs and outputs. Supervised machine-learning processes may include classification algorithms as defined above.

Further referring to FIG. 13, machine learning processes may include at least an unsupervised machine-learning processes 1332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 13, machine-learning module 1300 may be designed and configured to create a machine-learning model 1324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 13, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 14:
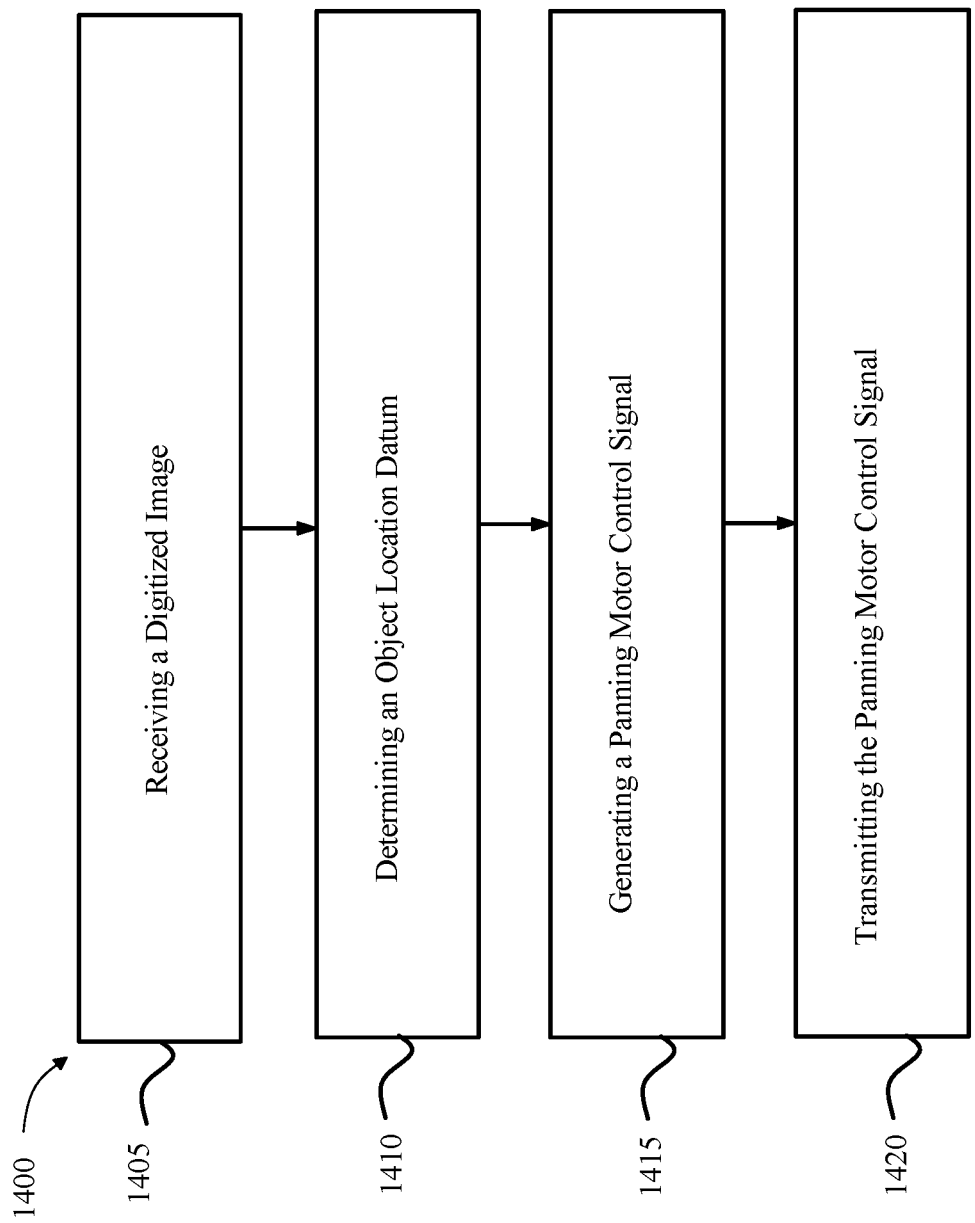
FIG. 14 is an exemplary embodiment of a method of autonomous tracking.

Referring now to FIG. 14, an exemplary embodiment of a method 1400 of autonomous tracking is illustrated. At step 1405, method 1400 includes receiving, at a controller and from a camera, a digitized image of a scene; this may be implemented without limitation as described above in reference to FIGS. 1-13.

At step 1410, and still referring to FIG. 14, controller determines an object location datum as a function of the digitized image; this may be implemented without limitation as described above in reference to FIGS. 1-13.

At step 1415, and further referring to FIG. 14, controller generates a panning motor control signal as a function of the object location communication; this may be implemented without limitation as described above in reference to FIGS. 1-13.

At step 1420, and with continued reference to FIG. 14, controller transmits the panning motor control signal to a panning motor, wherein the panning motor control signal causes the panning motor to rotate a body with respect to a base such that the object remains in the field of view of the camera; this may be implemented without limitation as described above in reference to FIGS. 1-13.

Still referring to FIG. 14, method may include generating a tilting motor control signal as a function of the object location communication; this may be implemented without limitation as described above in reference to FIGS. 1-13. Method may include sending a tilting motor control signal to the tilting motor, wherein the tilting motor control signal causes the tilting motor to rotate the stand relative to the base, such that the object remains in the field of view of the camera; this may be implemented without limitation as described above in reference to FIGS. 1-13 In general, method may include any step or sequence of steps in any order that a person skilled in the art would understand as within the scope of this disclosure having the benefit of the entirety of this disclosure, including any steps or sequences of steps in any order that any device may be configured to perform according to this disclosure.

Figure 15:
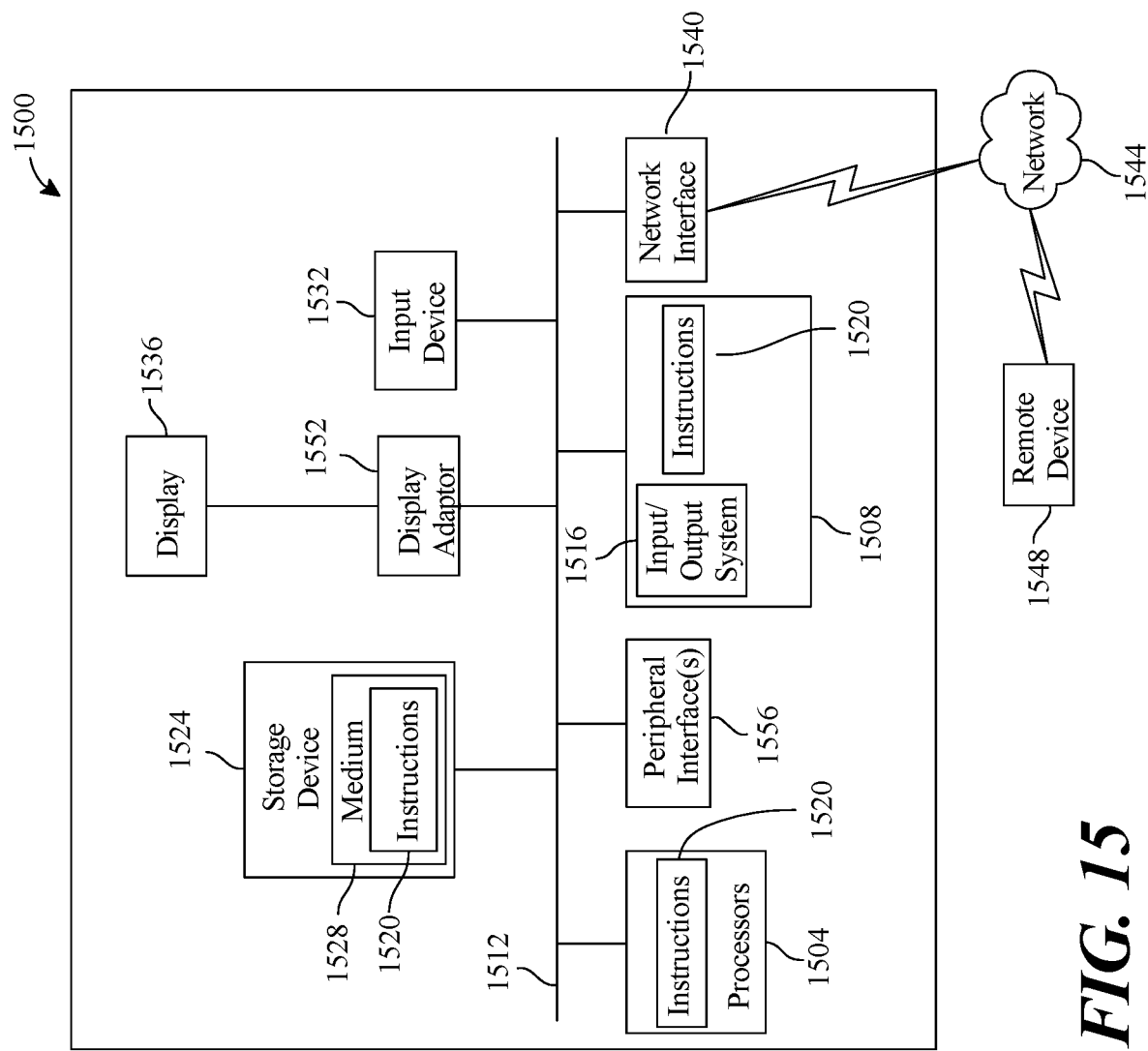
FIG. 15 is a block diagram of a computing system that can be used to implement any one or more of the methodologies disclosed herein and any one or more portions thereof.

FIG. 15 shows a diagrammatic representation of one embodiment of a computing device in the exemplary form of a computer system 1500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures.

Processor 1504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1504 may be organized according to Von Neumann and/or Harvard architecture as a non-limiting example. Processor 1504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1508 may include various components (e.g., machine-readable media) including, but not limited to, a random-access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable medium 1528 may provide nonvolatile and/or volatile storage of machine-readable instructions, data structures, program modules, and/or other data for computer system 1500. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540, may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 1504 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to devices and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An autonomous tracking device, the autonomous tracking device comprising:
    a base;
    a body, the body rotatably mounted to the base, wherein the body comprises a top side and a bottom side and the top side includes a stand recess;
    a stand, wherein the stand comprises:
        a proximal end, the proximal end mounted to the body;
        a distal end; and
        a retention device configured to hold a mobile device, wherein the stand is configured to support the mobile device using the retention device;
        wherein when the stand is in a stowed position:
            at least a portion of the stand is disposed in the stand recess;
            a front face of the stand is flush with a portion of the top side of the body surrounding the stand recess; and
            the field of view of the camera points in a vertical direction;
    a panning motor, wherein the panning motor is configured to rotate the body with respect to the base about a vertical axis;
    a camera, wherein the camera is configured to:
        capture a scene within a field of view of the camera; and
        create a digitized image of the scene;
    a controller, wherein the controller contains circuitry configured to:
        determine an object location datum as a function of the digitized image;
        generate a panning motor control signal as a function of the object location communication; and
        transmit the panning motor control signal to the panning motor, wherein the panning motor control signal causes the panning motor to rotate the body with respect to the base such that the object remains in the field of view of the camera.

2. The device of claim 1, further comprising a tilting motor, wherein the stand is rotatably mounted to the body and the tilting motor is configured to rotate the stand relative to the body about a horizontal axis, the controller contains circuitry further configured to:
    generate a tilting motor control signal as a function of the object location communication; and
    send a tilting motor control signal to the tilting motor, wherein the tilting motor control signal causes the tilting motor to rotate the stand relative to the base, such that the object remains in the field of view of the camera.

3. The device of claim 1, wherein:
    the panning motor drives a wheel;
    the wheel comprises an exterior surface; and
    at least a portion of the exterior surface of the wheel is in contact with the base.

4. The device of claim 3, wherein the exterior surface of the wheel comprises an elastomeric material.

5. The device of claim 3, wherein the body comprises at least a support wheel, wherein the at least a support wheel:
    is freely rotatable; and
    is in contact with the base.

6. The device of claim 3, wherein the panning motor is configured to rotate the body with respect to the base about a vertical axle, the vertical axle disposed along the vertical axis.

7. The device of claim 6, wherein the vertical axle, is connected to a rotation device, the rotation device restricting the relative motion of the body with respect to the base to rotation about the vertical axis.

8. The device of claim 1, wherein the stand comprises a tilting motor housing, wherein the motor housing comprises a first motor housing arm and a second motor housing arm, wherein the first motor housing arm and the second motor housing arm partially surround the tilting motor.

9. The device of claim 1, wherein the tilt motor is configured to rotate a tilt axle, wherein the tilt axle is connected to the stand.

10. The device of claim 1, further comprising a tilt sensor, wherein the tilt sensor measures a tilt angle formed by the stand and the body.

11. The device of claim 1, wherein the body comprises an energy source, wherein:
    the energy source is a battery; and
    the energy source is electrically connected to at least the controller and the panning motor.

12. The device of claim 1, wherein the retention device, comprises two protrusions wherein the protrusions are perpendicular to the front face of the stand.

13. The device of claim 1, wherein the body comprises:
    an energy source; and
    a mobile device charging port, wherein the mobile device charging port is configured to provide a wired charging connection to the mobile device such that mobile device is charged from the energy source.

14. The device of claim 13, wherein:
    the camera is located on the front face of the stand; and
    the camera comprises a lens, wherein the lens is flush with the front face of the stand.

15. The device of claim 14, wherein the camera is attached to the stand, such that the camera rotates with the stand.

16. The device of claim 1, wherein the bottom side of the body defines a base recess, wherein at least a portion of the base is disposed within the base recess.

17. The device of claim 1, wherein the object location communication is generated using computer vision methods.

\* \* \* \* \*